US008370200B2

(12) United States Patent
Golden et al.

(10) Patent No.: US 8,370,200 B2

(45) Date of Patent: *Feb. 5, 2013

(54) INTERACTIVE MARKETING NETWORK AND PROCESS USING ELECTRONIC CERTIFICATES

(75) Inventors: Steven M. Golden, Bloomingfield Hills, MI (US); Hillel Levin, River Forest, IL (US); Bradley A. Anderson, Hazel Park, MI (US); Gary D. Gentry, Brighton, MI (US); James A. Barbour, Dearborn, MI (US); Albert Schornberg, Holly, MI (US)

(73) Assignee: News America Marketing Properties LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/247,720

(22) Filed: Sep. 28, 2011

(65) Prior Publication Data

US 2012/0041805 A1 Feb. 16, 2012

Related U.S. Application Data

(63) Continuation of application No. 12/157,053, filed on Jun. 6, 2008, now Pat. No. 8,050,969, which is a continuation of application No. 09/490,362, filed on Jan. 24, 2000, now Pat. No. 7,401,032, which is a continuation of application No. 09/073,334, filed on May 6, 1998, now abandoned, which is a continuation of application No. 08/507,693, filed on Jul. 25, 1995, now Pat. No. 5,761,648.

(51) Int. Cl.
*G06Q 30/00* (2012.01)

(52) U.S. Cl. ............... 705/14.33; 705/14.67; 705/14.73; 705/14.1; 705/14.38; 705/14.49; 705/26.1

(58) Field of Classification Search ............... 705/14.33, 705/14.67, 14.73, 14.1, 14.38, 14.49, 26.1
See application file for complete search history.

(56) References Cited

U.S. PATENT DOCUMENTS

| | | | |
|---|---|---|---|
| 2,995,727 | A | 8/1961 | Quade |
| 3,212,062 | A | 10/1965 | Goldman et al. |
| 3,316,536 | A | 4/1967 | Andrews et al. |
| 3,318,428 | A | 5/1967 | Klein |
| 3,426,326 | A | 2/1969 | Goldstein |
| 3,465,289 | A | 9/1969 | Klein |
| 3,505,646 | A | 4/1970 | Affel, Jr. et al. |
| 3,526,308 | A | 9/1970 | Thomas |
| 3,606,688 | A | 9/1971 | Zawels et al. |
| 3,737,631 | A | 6/1973 | Harris |
| 3,770,941 | A | 11/1973 | Gechele et al. |

(Continued)

FOREIGN PATENT DOCUMENTS

| | | |
|---|---|---|
| CA | 2240432 | 7/1997 |
| CA | 2269624 | 5/1998 |

(Continued)

OTHER PUBLICATIONS

Office Action mailed Feb. 6, 2012 in U.S. Appl. No. 12/704,376.

(Continued)

*Primary Examiner* — Raquel Alvarez
(74) *Attorney, Agent, or Firm* — Foley & Lardner LLP

(57) ABSTRACT

A data processing system issuing electronic certificates through "online" networks. Each electronic certificate includes transaction data and identification data, and can be printed out on a printing device linked to a consumer's personal input device, or electronically stored in a designated data base until a specified expiration date. Consumers access the data processing system online, browse among their choices, and make their selections. Certificate issuers have online access to the data processing system and can create or revise offers, and provide various instructions pertaining to the certificates, including limitations as to the number of certificates to be issued in total and to each individual consumer.

19 Claims, 8 Drawing Sheets

COUPON FLOW
COUPON ISSUER
SELECTION PRINTING & REDEMPTION INFORMATION
SERVICE DATA BASE
SELECTION INFORMATION
PRINTING INFORMATION
REDEMPTION INFORMATION
CONSUMER'S PC
REDEMPTION INFORMATION
CONSUMER'S PRINTER
Coupon File
ISSUER DATA BASE
AUTOMATICALLY REDEEMED WITH PURCHASE
SUBMITTED AT CHECKOUT
RETAIL OUTLET

U.S. PATENT DOCUMENTS 3,771,132 A 11/1973 Biewer
3,777,410 A 12/1973 Robinson
3,848,193 A 11/1974 Martin et al.
3,889,062 A 6/1975 Epstein
3,899,775 A 8/1975 Larsen
3,959,624 A 5/1976 Kaslow
3,987,398 A 10/1976 Fung
4,002,886 A 1/1977 Sundelin
4,004,354 A 1/1977 Yamauchi
4,012,132 A 3/1977 Lazarus
4,014,004 A 3/1977 Fuller
4,044,380 A 8/1977 Justice et al.
4,071,697 A 1/1978 Bushnell et al.
4,071,740 A 1/1978 Gogulski
4,141,078 A 2/1979 Bridges et al.
4,166,540 A 9/1979 Marshall
4,170,782 A 10/1979 Miller
4,186,413 A 1/1980 Mortimer
4,186,438 A 1/1980 Benson et al.
4,208,652 A 6/1980 Marshall
4,210,961 A 7/1980 Whitlow et al.
4,224,644 A 9/1980 Lewis et al.
4,245,468 A 1/1981 Fondacci
4,247,759 A 1/1981 Yuris et al.
RE30,579 E 4/1981 Goldman et al.
RE30,580 E 4/1981 Goldman et al.
4,264,924 A 4/1981 Freeman
4,268,744 A 5/1981 McGeary
4,271,351 A 6/1981 Bloodworth
4,281,762 A 8/1981 Hattemer
4,287,592 A 9/1981 Paulish et al.
4,288,809 A 9/1981 Yabe
4,290,688 A 9/1981 Call
4,305,101 A 12/1981 Yarbrough et al.
4,307,446 A 12/1981 Barton et al.
4,331,973 A 5/1982 Eskin et al.
4,331,974 A 5/1982 Cogswell et al.
4,338,644 A 7/1982 Staar
4,347,498 A 8/1982 Lee et al.
4,355,372 A 10/1982 Johnson et al.
4,359,631 A 11/1982 Lockwood et al.
4,373,133 A 2/1983 Clyne et al.
4,381,522 A 4/1983 Lambert
4,396,985 A 8/1983 Ohara
4,404,589 A 9/1983 Wright, Jr.
4,405,946 A 9/1983 Knight
4,412,631 A 11/1983 Haker
4,419,573 A 12/1983 Von Geldern
4,429,385 A 1/1984 Cichelli et al.
4,449,186 A 5/1984 Kelly et al.
4,451,701 A 5/1984 Bendig
4,458,320 A 7/1984 Sutton
4,476,488 A 10/1984 Merrell
4,484,302 A 11/1984 Cason et al.
4,484,328 A 11/1984 Schlafly
4,488,179 A 12/1984 Kruger et al.
4,500,880 A 2/1985 Gomersall et al.
4,529,870 A 7/1985 Chaum
4,532,554 A 7/1985 Skala
4,536,791 A 8/1985 Campbell et al.
4,546,382 A 10/1985 McKenna et al.
4,554,446 A 11/1985 Murphy et al.
4,567,359 A 1/1986 Lockwood
4,573,072 A 2/1986 Freeman
4,575,579 A 3/1986 Simon et al.
RE32,115 E 4/1986 Lockwood et al.
4,588,881 A 5/1986 Pejas et al.
4,592,546 A 6/1986 Fascenda et al.
4,593,904 A 6/1986 Graves
4,597,046 A 6/1986 Musmanno et al.
4,602,279 A 7/1986 Freeman
4,603,232 A 7/1986 Kurland et al.
4,608,601 A 8/1986 Shreck et al.
4,625,275 A 11/1986 Smith
4,626,844 A 12/1986 Mann et al.
4,630,108 A 12/1986 Gomersall
4,635,132 A 1/1987 Nakamura
4,636,950 A 1/1987 Caswell et al.
4,641,205 A 2/1987 Beyers, Jr.
4,642,767 A 2/1987 Lerner
4,658,290 A 4/1987 McKenna et al.
4,659,073 A 4/1987 Leonard
4,669,730 A 6/1987 Small
4,670,853 A 6/1987 Stepien
4,672,377 A 6/1987 Murphy et al.
4,673,802 A 6/1987 Ohmae et al.
4,674,041 A 6/1987 Lemon et al.
4,677,466 A 6/1987 Lert et al.
4,691,351 A 9/1987 Hayashi et al.
4,691,354 A 9/1987 Palminteri
4,699,532 A 10/1987 Smith
4,701,794 A 10/1987 Froling et al.
4,703,423 A 10/1987 Bado et al.
4,706,080 A 11/1987 Sincoskie
4,706,121 A 11/1987 Young
4,713,761 A 12/1987 Sharpe et al.
4,723,212 A 2/1988 Mindrum et al.
4,724,307 A 2/1988 Dutton et al.
4,733,301 A 3/1988 Wright, Jr.
4,734,858 A 3/1988 Schlafly
4,738,441 A 4/1988 Leonard
4,745,468 A 5/1988 Von Kohorn
4,747,050 A 5/1988 Brachtl et al.
4,748,684 A 5/1988 Wright, Jr.
4,750,151 A 6/1988 Baus
4,751,578 A 6/1988 Reiter et al.
4,751,669 A 6/1988 Sturgis et al.
4,752,675 A 6/1988 Zetmeir
4,752,877 A 6/1988 Roberts et al.
4,759,063 A 7/1988 Chaum
4,764,666 A 8/1988 Bergeron
4,768,110 A 8/1988 Dunlap et al.
4,774,663 A 9/1988 Musmanno et al.
4,775,935 A 10/1988 Yourick
4,787,037 A 11/1988 Ootsuka
4,789,235 A 12/1988 Borah et al.
4,791,281 A 12/1988 Johnsen et al.
4,792,018 A 12/1988 Humble et al.
4,794,530 A 12/1988 Yukiura et al.
4,799,156 A 1/1989 Shavit et al.
4,805,134 A 2/1989 Calo et al.
4,807,031 A 2/1989 Broughton et al.
4,812,986 A 3/1989 Smith
4,815,030 A 3/1989 Cross et al.
4,815,741 A 3/1989 Small
4,816,904 A 3/1989 McKenna et al.
4,821,101 A 4/1989 Short
4,821,102 A 4/1989 Ichikawa et al.
4,823,122 A 4/1989 Mann et al.
4,825,045 A 4/1989 Humble
4,829,569 A 5/1989 Seth-Smith et al.
4,833,308 A 5/1989 Humble
4,843,546 A 6/1989 Yoshida et al.
4,847,690 A 7/1989 Perkins
4,850,007 A 7/1989 Marino et al.
4,853,882 A 8/1989 Marshall
4,855,908 A 8/1989 Shimoda et al.
4,858,000 A 8/1989 Lu
4,862,350 A 8/1989 Orr et al.
4,866,700 A 9/1989 Berry et al.
4,868,866 A 9/1989 Williams, Jr.
4,870,596 A 9/1989 Smith
4,872,113 A 10/1989 Dinerstein
4,873,662 A 10/1989 Sargent
4,876,592 A 10/1989 Von Kohorn
4,882,675 A 11/1989 Nichtberger et al.
4,882,724 A 11/1989 Vela et al.
4,887,208 A 12/1989 Schneider et al.
4,890,321 A 12/1989 Seth-Smith et al.
4,894,784 A 1/1990 Smith
4,896,791 A 1/1990 Smith
4,908,707 A 3/1990 Kinghorn
4,908,713 A 3/1990 Levine
4,908,761 A 3/1990 Tai
4,910,672 A 3/1990 Off et al.
4,914,698 A 4/1990 Chaum
4,922,522 A 5/1990 Scanlon

| | | | |
|---|---|---|---|
| 4,926,255 | A | 5/1990 | Von Kohorn |
| 4,926,256 | A | 5/1990 | Nanba |
| 4,926,480 | A | 5/1990 | Chaum |
| 4,929,819 | A | 5/1990 | Collins, Jr. |
| 4,930,011 | A | 5/1990 | Kiewit |
| 4,937,742 | A | 6/1990 | Marshall |
| 4,937,853 | A | 6/1990 | Brule et al. |
| 4,947,430 | A | 8/1990 | Chaum |
| 4,949,256 | A | 8/1990 | Humble |
| 4,959,686 | A | 9/1990 | Spallone et al. |
| 4,959,783 | A | 9/1990 | Scott et al. |
| 4,965,437 | A | 10/1990 | Nagai |
| 4,972,504 | A | 11/1990 | Daniel, Jr. et al. |
| 4,973,952 | A | 11/1990 | Malec et al. |
| 4,974,149 | A | 11/1990 | Valenti |
| 4,974,170 | A | 11/1990 | Bouve et al. |
| 4,975,904 | A | 12/1990 | Mann et al. |
| 4,975,905 | A | 12/1990 | Mann et al. |
| 4,975,951 | A | 12/1990 | Bennett |
| 4,977,455 | A | 12/1990 | Young |
| 4,982,337 | A | 1/1991 | Burr et al. |
| 4,982,346 | A | 1/1991 | Girouard et al. |
| 4,984,156 | A | 1/1991 | Mekata |
| 4,987,486 | A | 1/1991 | Johnson et al. |
| 4,987,593 | A | 1/1991 | Chaum |
| 4,991,011 | A | 2/1991 | Johnson et al. |
| 4,992,940 | A | 2/1991 | Dworkin |
| 4,994,908 | A | 2/1991 | Kuban et al. |
| 4,996,705 | A | 2/1991 | Entenmann et al. |
| 5,001,554 | A | 3/1991 | Johnson et al. |
| 5,003,384 | A | 3/1991 | Durden et al. |
| 5,003,472 | A | 3/1991 | Perrill et al. |
| 5,008,853 | A | 4/1991 | Bly et al. |
| 5,010,485 | A | 4/1991 | Bigari |
| 5,014,125 | A | 5/1991 | Pocock et al. |
| 5,014,212 | A | 5/1991 | Smith |
| 5,025,139 | A | 6/1991 | Halliburton, Jr. |
| 5,025,372 | A | 6/1991 | Burton et al. |
| 5,034,807 | A | 7/1991 | Von Kohorn |
| 5,039,848 | A | 8/1991 | Stoken |
| 5,047,614 | A | 9/1991 | Bianco |
| 5,048,833 | A | 9/1991 | Lamle |
| 5,053,889 | A | 10/1991 | Nakano et al. |
| 5,056,019 | A | 10/1991 | Schultz et al. |
| 5,057,915 | A | 10/1991 | Von Kohorn |
| 5,058,108 | A | 10/1991 | Mann et al. |
| 5,060,185 | A | 10/1991 | Naito et al. |
| 5,063,610 | A | 11/1991 | Alwadish |
| 5,069,453 | A | 12/1991 | Koza et al. |
| 5,070,404 | A | 12/1991 | Bullock et al. |
| 5,075,771 | A | 12/1991 | Hashimoto |
| 5,077,607 | A | 12/1991 | Johnson et al. |
| RE33,808 | E | 1/1992 | Wright, Jr. |
| 5,083,272 | A | 1/1992 | Walker et al. |
| 5,093,718 | A | 3/1992 | Hoarty et al. |
| 5,099,319 | A | 3/1992 | Esch et al. |
| 5,099,422 | A | 3/1992 | Foresman et al. |
| 5,105,184 | A | 4/1992 | Pirani et al. |
| 5,111,196 | A | 5/1992 | Hunt |
| 5,111,927 | A | 5/1992 | Schulze, Jr. |
| 5,117,355 | A | 5/1992 | McCarthy |
| 5,119,294 | A | 6/1992 | Tanaka |
| 5,119,295 | A | 6/1992 | Kapur |
| 5,124,909 | A | 6/1992 | Blakely et al. |
| 5,128,520 | A | 7/1992 | Rando et al. |
| 5,128,752 | A | 7/1992 | Von Kohorn |
| 5,128,861 | A | 7/1992 | Kagami et al. |
| 5,131,039 | A | 7/1992 | Chaum |
| 5,133,075 | A | 7/1992 | Risch |
| 5,136,501 | A | 8/1992 | Silverman et al. |
| 5,144,663 | A | 9/1992 | Kudelski et al. |
| 5,151,789 | A | 9/1992 | Young |
| 5,155,591 | A | 10/1992 | Wachob |
| 5,158,310 | A | 10/1992 | Tannehill et al. |
| 5,159,549 | A | 10/1992 | Hallman, Jr. et al. |
| 5,162,989 | A | 11/1992 | Matsuda |
| 5,168,445 | A | 12/1992 | Kawashima et al. |
| 5,173,594 | A | 12/1992 | McClure |
| 5,173,851 | A | 12/1992 | Off et al. |
| 5,176,224 | A | 1/1993 | Spector |
| 5,182,640 | A | 1/1993 | Takano |
| 5,185,695 | A | 2/1993 | Pruchnicki |
| 5,187,787 | A | 2/1993 | Skeen et al. |
| 5,192,854 | A | 3/1993 | Counts |
| 5,193,056 | A | 3/1993 | Boes |
| 5,198,644 | A | 3/1993 | Pfeiffer et al. |
| 5,200,823 | A | 4/1993 | Yoneda et al. |
| 5,200,993 | A | 4/1993 | Wheeler et al. |
| 5,202,826 | A | 4/1993 | McCarthy |
| 5,208,742 | A | 5/1993 | Warn |
| 5,214,792 | A | 5/1993 | Alwadish |
| 5,220,420 | A | 6/1993 | Hoarty et al. |
| 5,220,501 | A | 6/1993 | Lawlor et al. |
| 5,220,657 | A | 6/1993 | Bly et al. |
| 5,227,874 | A | 7/1993 | Von Kohorn |
| 5,230,048 | A | 7/1993 | Moy |
| 5,231,493 | A | 7/1993 | Apitz |
| 5,231,494 | A | 7/1993 | Wachob |
| 5,231,568 | A | 7/1993 | Cohen et al. |
| 5,235,509 | A | 8/1993 | Mueller et al. |
| 5,237,157 | A | 8/1993 | Kaplan |
| 5,237,496 | A | 8/1993 | Kagami et al. |
| 5,237,499 | A | 8/1993 | Garback |
| 5,237,620 | A | 8/1993 | Deaton et al. |
| 5,239,480 | A | 8/1993 | Huegel |
| 5,243,174 | A | 9/1993 | Veeneman et al. |
| 5,245,533 | A | 9/1993 | Marshall |
| 5,245,656 | A | 9/1993 | Loeb et al. |
| 5,249,044 | A | 9/1993 | Von Kohorn |
| 5,250,789 | A | 10/1993 | Johnsen |
| 5,251,324 | A | 10/1993 | McMullan, Jr. |
| 5,253,345 | A | 10/1993 | Fernandes et al. |
| 5,256,863 | A | 10/1993 | Ferguson et al. |
| 5,260,778 | A | 11/1993 | Kauffman et al. |
| 5,261,042 | A | 11/1993 | Brandt |
| 5,267,171 | A | 11/1993 | Suzuki et al. |
| 5,276,736 | A | 1/1994 | Chaum |
| 5,278,752 | A | 1/1994 | Narita et al. |
| 5,283,639 | A | 2/1994 | Esch et al. |
| 5,283,731 | A | 2/1994 | Lalonde et al. |
| 5,283,734 | A | 2/1994 | Von Kohorn |
| 5,285,272 | A | 2/1994 | Bradley et al. |
| 5,285,278 | A | 2/1994 | Holman |
| 5,287,181 | A | 2/1994 | Holman |
| 5,287,266 | A | 2/1994 | Malec et al. |
| 5,287,268 | A | 2/1994 | McCarthy |
| 5,295,064 | A | 3/1994 | Malec et al. |
| 5,297,026 | A | 3/1994 | Hoffman |
| 5,301,028 | A | 4/1994 | Banker et al. |
| 5,305,195 | A | 4/1994 | Murphy |
| 5,305,196 | A | 4/1994 | Deaton et al. |
| 5,305,197 | A | 4/1994 | Axler et al. |
| 5,305,199 | A | 4/1994 | LoBiondo et al. |
| 5,310,997 | A | 5/1994 | Roach et al. |
| 5,315,093 | A | 5/1994 | Stewart |
| 5,319,455 | A | 6/1994 | Hoarty et al. |
| 5,319,707 | A | 6/1994 | Wasilewski et al. |
| 5,331,544 | A | 7/1994 | Lu et al. |
| 5,337,155 | A | 8/1994 | Cornelis |
| 5,337,253 | A | 8/1994 | Berkovsky et al. |
| 5,339,239 | A | 8/1994 | Manabe et al. |
| 5,343,239 | A | 8/1994 | Lappington et al. |
| 5,343,300 | A | 8/1994 | Hennig |
| 5,345,594 | A | 9/1994 | Tsuda |
| 5,347,632 | A | 9/1994 | Filepp et al. |
| 5,353,218 | A | 10/1994 | De Lapa et al. |
| 5,355,480 | A | 10/1994 | Smith et al. |
| 5,357,276 | A | 10/1994 | Banker et al. |
| 5,361,393 | A | 11/1994 | Rossillo |
| 5,367,452 | A | 11/1994 | Gallery et al. |
| 5,368,129 | A | 11/1994 | Von Kohorn |
| 5,373,440 | A | 12/1994 | Cohen et al. |
| 5,377,095 | A | 12/1994 | Maeda et al. |
| 5,377,354 | A | 12/1994 | Scannell et al. |
| 5,380,991 | A | 1/1995 | Valencia et al. |
| 5,382,970 | A | 1/1995 | Kiefl |
| 5,388,165 | A | 2/1995 | Deaton et al. |
| 5,389,964 | A | 2/1995 | Oberle et al. |

5,396,417 A 3/1995 Burks et al.
5,401,946 A 3/1995 Weinblatt
RE34,915 E 4/1995 Nichtberger et al.
5,404,161 A 4/1995 Douglass et al.
5,404,505 A 4/1995 Levinson
5,404,523 A 4/1995 DellaFera et al.
5,406,475 A 4/1995 Kouchi et al.
5,408,417 A 4/1995 Wilder
5,412,191 A 5/1995 Baitz et al.
5,412,416 A 5/1995 Nemirofsky
5,416,842 A 5/1995 Aziz
5,420,606 A 5/1995 Begum et al.
5,426,594 A 6/1995 Wright et al.
5,430,644 A 7/1995 Deaton et al.
5,438,355 A 8/1995 Palmer
5,440,262 A 8/1995 Lum et al.
5,442,771 A 8/1995 Filepp et al.
5,446,916 A 8/1995 Derovanessian et al.
5,446,919 A 8/1995 Wilkins
5,448,471 A 9/1995 Deaton et al.
5,459,306 A 10/1995 Stein et al.
5,463,625 A 10/1995 Yasrebi
5,471,629 A 11/1995 Risch
RE35,117 E 12/1995 Rando et al.
5,483,049 A 1/1996 Schulze, Jr.
5,483,278 A 1/1996 Strubbe et al.
5,488,423 A 1/1996 Walkingshaw et al.
5,490,060 A 2/1996 Malec et al.
5,491,838 A 2/1996 Takahisa et al.
5,498,003 A 3/1996 Gechter
5,499,046 A 3/1996 Schiller et al.
5,500,514 A 3/1996 Veeneman et al.
5,500,681 A 3/1996 Jones
5,502,636 A 3/1996 Clarke
5,504,519 A 4/1996 Remillard
5,504,675 A 4/1996 Cragun et al.
5,508,731 A 4/1996 Kohorn
5,510,859 A 4/1996 Douglass et al.
5,511,160 A 4/1996 Robson
5,513,102 A 4/1996 Auriemma
5,513,109 A 4/1996 Fujishima
5,515,098 A 5/1996 Carles
5,515,270 A 5/1996 Weinblatt
5,523,794 A 6/1996 Mankovitz et al.
5,528,490 A 6/1996 Hill
5,535,118 A 7/1996 Chumbley
5,537,314 A 7/1996 Kanter
5,537,586 A 7/1996 Amram et al.
5,546,523 A 8/1996 Gatto
5,550,657 A 8/1996 Tanaka et al.
5,550,734 A 8/1996 Tarter et al.
5,557,518 A 9/1996 Rosen
5,557,721 A 9/1996 Fite et al.
5,564,073 A 10/1996 Takahisa
5,566,353 A 10/1996 Cho et al.
5,570,465 A 10/1996 Tsakanikas
5,572,643 A 11/1996 Judson
5,577,266 A 11/1996 Takahisa et al.
5,579,537 A 11/1996 Takahisa
5,581,764 A 12/1996 Fitzgerald et al.
5,583,563 A 12/1996 Wanderscheid et al.
5,584,025 A 12/1996 Keithley et al.
5,592,378 A 1/1997 Cameron et al.
5,592,379 A 1/1997 Finfrock et al.
5,592,560 A 1/1997 Deaton et al.
5,594,493 A 1/1997 Nemirofsky
5,594,910 A 1/1997 Filepp et al.
5,600,366 A 2/1997 Schulman
5,604,542 A 2/1997 Dedrick
5,612,527 A 3/1997 Ovadia
5,612,730 A 3/1997 Lewis
5,612,868 A 3/1997 Off et al.
5,617,565 A 4/1997 Augenbraun et al.
5,621,812 A 4/1997 Deaton et al.
5,634,101 A 5/1997 Blau
5,636,346 A 6/1997 Saxe
5,638,457 A 6/1997 Deaton et al.
5,642,484 A 6/1997 Harrison et al.
5,642,485 A 6/1997 Deaton et al.
5,644,723 A 7/1997 Deaton et al.
5,647,677 A 7/1997 Smith
5,649,114 A 7/1997 Deaton et al.
5,652,421 A 7/1997 Veeneman et al.
5,659,469 A 8/1997 Deaton et al.
5,661,517 A 8/1997 Budow et al.
5,664,110 A 9/1997 Green et al.
5,675,662 A 10/1997 Deaton et al.
5,679,938 A 10/1997 Templeton et al.
5,679,940 A 10/1997 Templeton et al.
5,687,322 A 11/1997 Deaton et al.
5,689,100 A 11/1997 Carrithers et al.
5,696,965 A 12/1997 Dedrick
5,697,844 A 12/1997 Von Kohorn
5,701,252 A 12/1997 Facchin et al.
5,701,451 A 12/1997 Rogers et al.
5,706,507 A 1/1998 Schloss
5,708,780 A 1/1998 Levergood et al.
5,708,782 A 1/1998 Larson et al.
5,710,884 A 1/1998 Dedrick
5,710,886 A 1/1998 Christensen et al.
5,710,887 A 1/1998 Chelliah et al.
5,712,979 A 1/1998 Graber et al.
5,713,795 A 2/1998 Kohorn
5,715,314 A 2/1998 Payne et al.
5,715,399 A 2/1998 Bezos
5,717,860 A 2/1998 Graber et al.
5,717,923 A 2/1998 Dedrick
5,721,908 A 2/1998 Lagarde et al.
5,724,424 A 3/1998 Gifford
5,724,521 A 3/1998 Dedrick
5,727,153 A 3/1998 Powell
5,734,823 A 3/1998 Saigh et al.
5,734,838 A 3/1998 Robinson et al.
5,740,549 A 4/1998 Reilly et al.
5,752,238 A 5/1998 Dedrick
5,752,246 A 5/1998 Rogers et al.
5,754,787 A 5/1998 Dedrick
5,754,938 A 5/1998 Herz et al.
5,754,939 A 5/1998 Herz et al.
5,754,949 A 5/1998 Kumagai et al.
5,758,257 A 5/1998 Herz et al.
5,758,328 A 5/1998 Giovannoli
5,759,101 A 6/1998 Von Kohorn
5,761,601 A 6/1998 Nemirofsky et al.
5,761,648 A 6/1998 Golden et al.
5,761,662 A 6/1998 Dasan
5,768,521 A 6/1998 Dedrick
5,774,170 A 6/1998 Hite et al.
5,774,868 A 6/1998 Cragun et al.
5,774,869 A 6/1998 Toader
5,774,870 A 6/1998 Storey
5,791,991 A 8/1998 Small
5,793,497 A 8/1998 Funk
5,793,849 A 8/1998 Young et al.
5,794,207 A 8/1998 Walker et al.
5,794,210 A 8/1998 Goldhaber et al.
5,796,393 A 8/1998 MacNaughton et al.
5,796,945 A 8/1998 Tarabella
5,796,952 A 8/1998 Davis et al.
5,797,127 A 8/1998 Walker et al.
5,802,497 A 9/1998 Manasse
5,806,044 A 9/1998 Powell
5,806,045 A 9/1998 Biorge et al.
5,809,242 A 9/1998 Shaw et al.
5,812,647 A 9/1998 Beaumont et al.
5,812,668 A 9/1998 Weber
5,812,769 A 9/1998 Graber et al.
5,812,776 A 9/1998 Gifford
5,815,657 A 9/1998 Williams et al.
5,822,735 A 10/1998 De Lapa et al.
5,826,244 A 10/1998 Huberman
5,832,457 A 11/1998 O'Brien et al.
5,832,458 A 11/1998 Jones
5,832,459 A 11/1998 Cameron et al.
5,835,087 A 11/1998 Herz et al.
5,838,790 A 11/1998 McAuliffe et al.
5,838,906 A 11/1998 Doyle et al.
5,839,117 A 11/1998 Cameron et al.

5,845,259 A 12/1998 West et al.
5,848,396 A 12/1998 Gerace
5,850,446 A 12/1998 Berger et al.
5,855,007 A 12/1998 Jovicic et al.
5,855,008 A 12/1998 Goldhaber et al.
5,857,175 A 1/1999 Day et al.
5,859,414 A 1/1999 Grimes et al.
5,862,325 A 1/1999 Reed et al.
5,864,825 A 1/1999 Kobayashi et al.
RE36,116 E 2/1999 McCarthy
5,870,721 A 2/1999 Norris
5,870,723 A 2/1999 Pare et al.
5,870,724 A 2/1999 Lawlor et al.
5,873,068 A 2/1999 Beaumont et al.
5,878,222 A 3/1999 Harrison
5,880,769 A 3/1999 Nemirofsky et al.
5,884,277 A 3/1999 Khosla
5,884,278 A 3/1999 Powell
5,884,309 A 3/1999 Vanechanos
5,887,271 A 3/1999 Powell
5,889,863 A 3/1999 Weber
5,890,137 A 3/1999 Koreeda
5,890,152 A 3/1999 Rapaport et al.
5,892,827 A 4/1999 Beach et al.
5,893,075 A 4/1999 Plainfield et al.
5,901,287 A 5/1999 Bull et al.
5,903,874 A 5/1999 Leonard et al.
5,905,246 A 5/1999 Fajkowski
5,907,704 A 5/1999 Gudmundson et al.
5,907,830 A 5/1999 Engel et al.
5,907,831 A 5/1999 Lotvin et al.
5,909,023 A 6/1999 Ono et al.
5,909,673 A 6/1999 Gregory
5,913,215 A 6/1999 Rubinstein et al.
5,914,712 A 6/1999 Sartain et al.
5,915,007 A 6/1999 Klapka
5,915,243 A 6/1999 Smolen
5,916,024 A 6/1999 Von Kohorn
5,918,014 A 6/1999 Robinson
5,918,211 A 6/1999 Sloane
5,918,213 A 6/1999 Bernard et al.
5,923,016 A 7/1999 Fredregill et al.
5,923,552 A 7/1999 Brown et al.
5,924,080 A 7/1999 Johnson
5,926,795 A 7/1999 Williams
5,931,917 A 8/1999 Nguyen et al.
5,933,811 A 8/1999 Angles et al.
5,933,827 A 8/1999 Cole et al.
5,943,424 A 8/1999 Berger et al.
5,948,040 A 9/1999 DeLorme et al.
5,948,061 A 9/1999 Merriman et al.
5,950,173 A 9/1999 Perkowski
5,956,027 A 9/1999 Krishnamurthy
5,963,924 A 10/1999 Williams et al.
5,970,469 A 10/1999 Scroggie et al.
5,970,472 A 10/1999 Allsop et al.
5,974,396 A 10/1999 Anderson et al.
5,974,399 A 10/1999 Giuliani et al.
5,978,013 A 11/1999 Jones et al.
5,978,840 A 11/1999 Nguyen et al.
5,979,757 A 11/1999 Tracy et al.
5,982,891 A 11/1999 Ginter et al.
5,982,892 A 11/1999 Hicks et al.
5,983,196 A 11/1999 Wendkos
5,983,208 A 11/1999 Haller et al.
5,987,132 A 11/1999 Rowney
5,987,504 A 11/1999 Toga
5,991,735 A 11/1999 Gerace
5,992,888 A 11/1999 North et al.
5,995,015 A 11/1999 DeTemple et al.
5,995,942 A 11/1999 Smith et al.
5,996,076 A 11/1999 Rowney et al.
5,999,912 A 12/1999 Wodarz et al.
5,999,914 A 12/1999 Blinn et al.
6,002,394 A 12/1999 Schein et al.
6,002,767 A 12/1999 Kramer
6,002,771 A 12/1999 Nielsen
6,006,197 A 12/1999 Deon et al.
6,009,410 A 12/1999 LeMole et al.
6,009,411 A 12/1999 Kepecs
6,012,038 A 1/2000 Powell
6,012,039 A 1/2000 Hoffman et al.
6,014,634 A 1/2000 Scroggie et al.
6,016,509 A 1/2000 Dedrick
6,021,362 A 2/2000 Maggard et al.
6,026,368 A 2/2000 Brown et al.
6,026,369 A 2/2000 Capek
6,026,370 A 2/2000 Jermyn
6,029,141 A 2/2000 Bezos et al.
6,029,142 A 2/2000 Hill
6,039,244 A 3/2000 Finsterwald
6,041,308 A 3/2000 Walker et al.
6,041,309 A 3/2000 Laor
6,047,263 A 4/2000 Goodwin, III
6,049,778 A 4/2000 Walker et al.
6,055,513 A 4/2000 Katz et al.
6,055,542 A 4/2000 Nielsen et al.
6,055,573 A 4/2000 Gardenswartz et al.
6,061,660 A 5/2000 Eggleston et al.
6,073,105 A 6/2000 Sutcliffe et al.
6,075,971 A 6/2000 Williams et al.
6,076,068 A 6/2000 DeLapa et al.
6,076,069 A 6/2000 Laor
6,105,002 A 8/2000 Powell
6,112,988 A 9/2000 Powell
6,119,101 A 9/2000 Peckover
6,119,933 A 9/2000 Wong et al.
6,123,647 A 9/2000 Mitchell
6,129,274 A 10/2000 Suzuki
6,131,087 A 10/2000 Luke et al.
6,134,532 A 10/2000 Lazarus et al.
6,138,911 A 10/2000 Fredregill et al.
6,141,010 A 10/2000 Hoyle
6,151,600 A 11/2000 Dedrick
6,185,541 B1 2/2001 Scroggie et al.
6,230,143 B1 5/2001 Simons et al.
6,237,145 B1 5/2001 Narasimhan et al.
6,266,649 B1 7/2001 Linden et al.
6,282,516 B1 8/2001 Giuliani
6,298,330 B1 10/2001 Gardenswartz et al.
6,321,208 B1 11/2001 Barnett et al.
6,330,543 B1 12/2001 Kepecs
6,336,099 B1 1/2002 Barnett et al.
7,013,286 B1 3/2006 Aggarwal et al.
7,401,032 B1 7/2008 Golden et al.
8,050,969 B2 11/2011 Golden et al.
2001/0054066 A1 12/2001 Spitzer
2002/0178051 A1 11/2002 Golden et al.
2003/0018522 A1 1/2003 Denimarck et al.
2004/0030598 A1 2/2004 Boal
2004/0193487 A1 9/2004 Purcell et al.
2005/0075926 A1 4/2005 Liu et al.
2005/0234771 A1 10/2005 Register et al.
2006/0053437 A1 3/2006 Bruner
2006/0235199 A1 10/2006 Mihara
2006/0282410 A1 12/2006 Weitzman et al.
2007/0073690 A1 3/2007 Boal et al.
2007/0244745 A1 10/2007 Boal
2008/0288353 A1 11/2008 Golden et al.
2010/0042490 A1 2/2010 Boal
2011/0153410 A1 6/2011 Muthugopalakrishnan et al.

FOREIGN PATENT DOCUMENTS

CA 2405148 A1 10/2001
CA 2408278 A1 11/2001
CA 2619603 A1 2/2007
CA 2672294 A1 7/2008
CA 2684094 A1 11/2008
EP 0 113 022 B1 5/1989
EP 0 822 535 2/1998
EP 0 825 619 2/1998
EP 0 512 509 7/1999
FR 512509 1/1921
GB 1 287 304 8/1972
GB 1 437 883 6/1976
GB 2 034 995 10/1979
GB 2 105 075 5/1982
GB 2 141 907 A 1/1985

| | | | |
|---|---|---|---|
| GB | 2 185 670 | A | 7/1987 |
| GB | 2 207 314 | A | 1/1989 |
| GB | 2 256 549 | A | 12/1992 |
| GB | 2 281 434 | A | 3/1995 |
| JP | 03-204259 | | 9/1991 |
| JP | 04-250591 | | 9/1992 |
| JP | 06-314184 | | 11/1994 |
| JP | 07-181891 | | 7/1995 |
| JP | 07-306654 | | 11/1995 |
| JP | 08-115361 | | 5/1996 |
| JP | 09-231263 | | 9/1997 |
| JP | 10-143563 | | 5/1998 |
| JP | 10-187320 | | 7/1998 |
| WO | WO-85/01373 | | 3/1985 |
| WO | WO-88/04507 | | 6/1988 |
| WO | WO-90/07844 | | 7/1990 |
| WO | WO-92/12488 | | 7/1992 |
| WO | WO-92/20030 | | 11/1992 |
| WO | WO-93/09631 | | 5/1993 |
| WO | WO 93/12566 | | 6/1993 |
| WO | WO 93/15466 | | 8/1993 |
| WO | WO-93/19427 | | 9/1993 |
| WO | WO 94/27231 | | 11/1994 |
| WO | WO-95/03570 | | 2/1995 |
| WO | WO 95/16971 | | 6/1995 |
| WO | WO-95/31069 | | 11/1995 |
| WO | WO-96/30864 | | 10/1996 |
| WO | WO-96/34466 | | 10/1996 |
| WO | WO-96/36141 | | 11/1996 |
| WO | WO-97/05555 | | 2/1997 |
| WO | WO-97/23838 | | 7/1997 |
| WO | WO-97/30409 | | 8/1997 |
| WO | WO-97/31322 | | 8/1997 |
| WO | WO-98/18093 | | 4/1998 |
| WO | WO-99/12115 | | 3/1999 |
| WO | WO-99/52055 | | 10/1999 |
| WO | WO 2006/075219 | A1 | 7/2006 |
| WO | WO-2009/140444 | A2 | 11/2009 |

OTHER PUBLICATIONS

Office Action mailed Feb. 7, 2012 in U.S. Appl. No. 13/253,590.
U.S. Appl. No. 09/073,334, filed May 6, 1998, Golden.
U.S. Appl. No. 09/290,441, filed Apr. 13, 1999, Golden.
U.S. Appl. No. 13/191,044, filed Jul. 26, 2011, Aversano.
U.S. Appl. No. 13/247,720, filed Sep. 28, 2011, Golden.
U.S. Appl. No. 13/253,590, filed Oct. 5, 2011, Christie.
U.S. Appl. No. 90/005,641, filed Feb. 18, 2000, Golden.
"Acu-Trac and Cox Launch Interactive Couponing Service," Electronic Marketplace Report, Mar. 21, 1995, vol. 9, No. 6, Information Access Company, (2 pages).
"AT&T GIS and MEI offer in-store electronic coupon solution", News Release by AT&T, May 2, 1994.
"Comp-U-Mall Marks Next Step in Electronic Shopping", ComputerWorld (vol. XVIII, No. 4), of Jan. 23, 1984.
Coupons Online and CMS Profiles Overview, Nov. 1995, CMS Inc.
"Interactive Online Targeted Coupon Delivery . . . " from Coupons Online™, Jan. 1995.
"Kiosks Help Grand Union Cut Millions From Ad Budget", ET of Oct. 1997.
"New Citicorp Subsidiary Will Provide Information Services to Grocery Field", Frozen Food Age, New York, NY, Feb. 1987, p. 1.
"New Video Game: Shopping", The New York Times, Apr. 26, 1984.
"Online Coupon Delivery", Advertisement in the New York Times, Business Section, Jun. 21, 1995.
"Preview of Food Marketing Institute's Annual Convention and Educational Exposition" held at the Dallas Convention Center, May 1984.
Sep. 19, 1999 Memorandum Re: Phase 1 Functional Requirements for Catalina Online.
Advertisement for: "EAN Introduces Electronic In-Store Coupons", Advertising Age, Jun. 27, 1983.
Anderson, Keith, "Electronic Coupons a la Carte", The Dallas Morning News, Oct. 11, 1983.
Anderson, Keith, Texas-Groceries Get Computers That Dispense Coupons, Eight at a Clip' Los Angeles Times, Oct. 24, 1983.
Appeal Brief filed in response to examiners Dec. 18, 2002 office action.
Apr. 19, 1996, "Cruising for Food Savings on the Internet" San Diego Union—Tribune, p. C1.
Apr. 19, 1996, "San Jose Customers Can Now Plan Supermarket Shopping in Cyberspace—New Internet Service Saves Shoppers Time and Money" Catalina Marketing Corporation Newsletter.
Apr. 1997, R. Resnick, "The Case for 'Opt In' Marketing on the Internet" Direct Marketing, vol. 59, No. 12 pp. 52-53.
Arlen, Gary H., "Creating the Home Information Appliance", Arlen Communications Inc., Mar. 1990.
Armstrong, Larry, "Coupon clippers, save your scissors" Business Week, Jun. 20, 1994, vol. 18, No. 4, p. 164-166.
Aug. 5, 1997, "Internet Coupon Security Breakthrough Removes Major Obstacle to Online Packaged Goods Advertising" SuperMarkets Online.
Bayer, Tom, "Supermarket Coupons Put At Consumer's Touch", Advertising Age, Mar. 12, 1984.
Bernicker, "Neilsen Plans Internet Service," Broadcasting & Cable, 125(30), Jul. 24, 1995, p. 34.
Beyer, Leslie, "When Crime Pays", from Grocery Headquarters, Dec. 1997, v63, n12, p. 41 (3).
Booth, Lynn, News Release from Comp-U-Card International, Inc., (Facts Sheet about the company).
Broadcasting & Cable, 125(30), Jul. 24, 1995, Bernicker, "Nielsen Plans Internet Service," p. 34.
CERN http Reference Manual, A Guide to a World-Wide Web Hyper Text Daemon (Apr. 1994).
Claims in U.S. Appl. No. 09/401,939, filed Sep. 23, 1999.
Claims in U.S. Appl. No. 09/756,788, filed Jan. 10, 2001.
Comp-U-Card International Incorporated Annual Report for year ending Jan. 31, 1984.
Crocker, Chris, "Connect Time: Combating Shopping Mall Phobias", Microcomputing of Nov. 1984.
Culnan, Mary J., "How Did They Get My Name?: An Exploratory Investigation of Consumer Attitudes Toward Secondary Information Use", MIS Quarterly, Sep. 1993, pp. 341-363.
Dec. 1, 1997, "Internet and Food Industries Embrace Secure Online Coupon Format" SuperMarkets Online.
Dec. 1992, "Interactive Cable System Receives Strong Response" Direct Marketing, pp. 9-10.
Dec. 8, 1995, H.G. Lewis "Cruising Down the Hyper Space Road: How to Write Copy for the (GULPI) Internet" Direct Marketing, vol. 58 No. 8, pp. 14-15.
Declaration of Michael Golino, *Internet Coupon Solutions LLC* v. *Coupons.com Incorporated, News America Marketing Interactive, LLC, ValPak Direct Marketing Systems, Inc.* and *Valassis Communications, Inc.*, Civil Action No. 6:09-cv-00261, Judge Leonard Davis, Sep. 2, 2009.
Declaration of Simon Higgs, *Internet Coupon Solutions LLC* v. *Coupons.com Incorporated, News America Marketing Interactive, LLC, ValPak Direct Marketing Systems, Inc.* and *Valassis Communications, Inc.*, Civil Action No. 6:09-cv-00261, Apr. 21, 2010.
Donaton, Scott, "New Media Digging Up Old Tools", Advertising Age of Jul. 1995.
Dworsky, E., "Consumer World Launch on the Internet," M2 Presswire, M-2 Communications. Ltd., Sep. 26, 1995.
Egner, "High-Tech Calling at Home Shopping Network," Florida Business-Tampa Bay, vol. 5, No. 6, S1, Jun. 1990, p. 20.
Elliott, Stuart, "A Last Hurdle for Shoppers: The Checkout-Counter Pitch", N.Y. Times, Jan. 11, 1993, The New York Times Company, (2 pages).
Elliott, Stuart, "A Last Hurdle for Shoppers: The Checkout-Counter Pitch", N.Y. Times, Jan. 11, 1993 ("1993 New York Times Article") (Exhibit 7).
Email from Mike Kacaba Regarding Phase One Requirements Document Version 1.0, dated Sep. 19, 1995 and Draft Requirements Document Attached to that Email.
European Search Report Dated Dec. 29, 1999, in Application No. EP969280130.
Examiner affidavit supporting obviousness rejection contained in the official action mailed Dec. 18, 2002 in U.S. Appl. No. 09/526,535; 5 pages.

Excerpt from "Comp-U-Card Launches Test of Public-Access Interactive Shopping Kiosk", DirecTech Report, Feb. 1985 (vol. 2, No. 2).
Excerpt from Business Notes: "Coupons for the Computer Age", Time, Feb. 3, 1986.
Excerpt from The Wall Street Journal, of Feb. 12, 1985 (p. 52) Re: Comp-U-Card International.
Excerpt of "Technology Application", Comp-U-Mall T.A.P. Report ,vol. 2, No. 2, Feb. 1985.
Fawcett , "Trading Scissors for Modems" Advertising Age, Jun. 6, 1995.
Feb. 11, 1996, Catalina Marketing Online Launch to include More than 1,600 California Stores Catalina Marketing Corporation Newsletter.
Feinberg, Samuel, "From Where I Sit", Women's Wear Daily of Aug. 28, 1984.
Gallant, John, "Comp-U-Card Plys High-tech Merchandising", ComputerWorld (vol. XVIII, No. 4), of Jan. 23, 1984.
Ghose et al., "Interactive Functions and Their on the Appeal of Presence Sites", from Journal of Advertising Research, Mar./Apr. 1996, v38, n2, pp. 29-43.
Hansard, Donna Steph, "Arlington Distributing Firm Making a Coup with Coupons", The Dallas Morning News of Apr. 19, 1983.
Heller, Al, "Coupons by Computers", Venture, Apr. 1984.
International Search Report dated Dec. 3, 1999 in International Application No. PCT/US99/09960.
International Search Report for PCT/US01/19204, International Filing Date Jun. 15, 2001, Priority Date Jun. 19, 2000.
International Search Report for PCT/US96/20497, International Filing Date Dec. 23, 1996, Priority Date Dec. 26, 1995.
Jun. 1, 1996, Laurie Peterson, "Click Here for Coupons" Direct p. 45.
Jun. 13, 1996, "PNC Bank Announces Internet Site, Plans Comprehensive Service Expansion" Business Wire.
Kahn, Joseph, P. & Hartman, Curtis, Excerpt from "New Faces of 1984", Inc. of May 1984.
Kamiba, "The Karaoke Chronicle: an interactive personal newspaper by the use of an agent function over WWW," Report by Association of Information Processing, vol. 95, No. 115, Dec. 1, 1995, pp. 13-18.
Kessler, Felix, "The Costly Coupon Craze", Fortune, Jun. 9, 1986.
Kikuchi et al., "Surging Online Products," Nikkei Communications, No. 212, Nikkei Business Publications, Inc. Dec. 18, 1995, pp. 136 to 140.
Klokis, Holly, "Ukrop's Tests Data Base Marketing Program" Electronic Couponing Tracks Buying Behavior of Valued Customers, Chain Store Age Executive, Sep. 1987, pp. 73-74 and 78.
Krakowka, Lisa, "Savings in Cyberspace", Marketing Tools, Oct. 1995.
Lazarus, George, "The New Video Coupon Game", Adweek, Dec. 3, 1984, p. 10.
Letter from Russell J. Genet at Jenkins & Gilchrist, to the USPTO dated Oct. 17, 2001.
Lin, Jennifer, "Future Sell: Shopping by Computer", The Philadelphia Inquirer, Jan. 1, 1984.
Lynch, "Online//Put away the scissors: Try coupons on the Web," Sep. 25, 1995, Orange County Register, Morning Edition, d. 24 [retrieved on Oct. 9, 2002], Internet URL:http://global.umi.com/pqdweb?Did=000000020851557&Fmt=3&Deli=1&Md=1&Idx+1& Sid=1&RQT=309.
Magazine article internet printout, "Coupon Clippers, save your scissors," Business Week, Jun. 20, 1994, 3 pp. (Already made of record).
Mar. 1999, www.freesamples.com. Reprinted on Oct. 3, 2001, by Rebecca Brimmer, since the original copy could not be found.
May 16, 1994 "SLED InterNIC Debut Internet Services" PC Week p. 130.
May 1994, David Bank "Email Marketing Firm Using Discount Strategy" San Jose Mercury News.
May 9, 1994, "SLED Internet Directory Distributes Electronic Coupons" PR Newswire.
McCready, Anne, "Electrinic Coupon Dispensers at Many Dallas-Ft. Worth Stores", Supermarket News of Oct. 10, 1993.
Meyer, Ed, "Ringing in a New Era", Advertising Age, Dec. 12, 1983.
Moeller, M., "Let's Hang Out at the E-Mall," PC Week, vol. 12, No. 44, Nov. 6, 1995, p. 75 (1).
Morris, "HTML for Fun and Profit," Sun Microsystems, Inc., 1995; pp. 169-170.
Naidus, Michael, "Mail Fraud Alleged in Coupion Scheme", Newsday, Aug. 8, 1985.
Neilsen, Jr., Arthur C., "The Growing Importance of Coupons—And How to Use Them Effectively", NCH Reporter, Nov. 1, 1983.
NetSol to Keep Domain Data; www.wired.com/news/politics/0,1238,31551,00.HTML; Sep. 28, 1999; 2 pages.
Network Solutions Registers Record Number of Internet Named in 1997; www.verisign.com/corporate/news/apr__19980107.html; Oct. 10, 2003; 2 pages.
Newspaper article internet printout, "American Express Applies for a New Line of Credit," The New York Times, Jul. 30, 1995. (Already made of record).
Newspaper article internet printout, "Checking Out the Customer, New Technology Can Give Stores Detailed Knowledge About Buyers' Habits," The Washington Post, Jul. 9, 1989, 8 pp. (Already made of record).
Nikkei Multimedia for Business (Mar. 1998) No. 32, pp. 119-123.
Nikkei Multimedia for Business (Sep. 1998), No. 38, pp. 66-71.
Nov. 4, 1996, John Fontant "2nd Net Bank Opens for Business" Communicationsweek, p. 46.
Oct. 20, 1998, "IntelliQuest Looks for Interaction with Loyalty, Web Traffic Programs" Electronic Advertising & Marketplace Report.
Office Action on 081356-0209 DTD Sep. 12, 2008.
Office Action on 085449-0174 DTD Jan. 23, 2008.
Office Actions from U.S. Appl. No. 09/526,535 dated Dec. 18, 2002 and Nov. 22, 2002 concerning Examiner reference of PerformanceBike.
Pages.alexa.com/company/index.html?p=Dest_W_t_40_B1, Alexa Web Search History, 2 pages, Jan. 10, 2003.
Paper presented at the USENIX Technical Conference, New Orleans, LA, Jan. 1995, Yan et al., "SIFT—A Tool For Wide-Area Information Dissemination," pp. 177-186.
Pazzani et al., "Learning From Hotlists and Coldlists: Towards a WWW Information Filtering and Seeking Agent," Proceedings International Conference on Tools With Artificial Intelligence, Jan. 1995, pp. 492-495.
Peppers, Don and Rogers, Ph.D., Martha, The One to One Future: Building Relationships One Customer at a Time, Currency Doubleday, Aug. 1993.
Perth, 2nd International Interactive Multimedia Symposium, Western Austalia, Jan. 23-28, 1994.
Petre, Peter, "The Man Who Computerized Bargain Hunting", Fortune of Jul. 9, 1984.
PR Newswire, USA: SLED Internet Directory Distributes Electronic Coupons, Reuters Info. Svcs, May 9, 1994.
Prinout from www.netsol.com's WHOIS search engine for www.PerformanceBike.com.; retrieved Dec. 2, 2002; 2 pages.
Printout of 13 pages of the performancebike.com web site from Nov. 15, 1999 as stored in the Wayback Machine.
Printout of 7 pages from the performancebike.com web site from Dec. 24, 1997, as stored in the Wayback Machine.
Printout of the Wayback Machine's search result for http://performancebike.com conducted on Nov. 27, 2002.
Proceedings International Conference on Tools with Artificial Intelligence, Jan. 1995, Pazzani et al., "Learning from Hitlists and Coldlists: Towards a WWW Information Filtering and Seeking Agent," pp. 402-495.
Ratcliffe, Mitch, "Lucie; interactive information, advertising stands upright, prepares to walk", Digital Media, vol. 4, No. 1, Jun. 8, 1994.
Response Reward Systems L.C., Response Reward Interactive In-Home Couponing Systems & Methods, Mar. 7, 1996.
Response Reward Systems, Highlights of Interactive Technologies of Response Reward Systems L.C. For purposes of illustration, a number of selected patents are listed, Revised as of Oct. 31, 1997.
Response Reward Systems, Interactive Results with One Way Communication in Entertainment Televised Home Shopping Market Research Education; Oct. 30, 1989.
Response Reward Systems, Interactive Television, Internet, Radio and Telephone Technologies (as of Jun. 1999).

Response Reward Systems, Interactive TV Technology, etc., Address by Henry Von Kohorn to the Broadcasting Promotion and Marketing Executives Conference, Baltimore, Jun. 17, 1991,
Response Reward Systems, L.C., Game Show and Quiz Programs; Apr. 1993.
Response Reward Systems, L.C., Summary of Patented Interactive Technologies in the fields of Marketing and Entertainment, as of Jun. 30, 1996.
Response Reward Systems, L.C., Vonkohorn Interactive Patents, Examples, Scenariois, Flowsheets and Claims selected from Patents covering Electronic Systems and Methods (reviewed as of Jan. 1, 1995).
Response Reward Systems, Sports and Trivia; revised as of Dec. 1, 1998.
Response Reward Systems, The Response Reward Technology; May 1995.
Saddler, Jeanne, "Computer Users Shop at Home Over the Phone", The Wall Street Journal, Feb. 20, 1985.
San Francisco Reservations, "Leave the Hotels in San Francisco to Us" Internet Magazine, No. 2, Dec. 18, 1994, Impress Corporation, pp. 126-127.
Schneider, Lois, "On Your Screen", Electronic Publishing and Bookselling of Mar. 1984.
Sep. 25, 1995, "Electronic Coupon Program Offers Database Potential" Marketing News.
Sep. 30, 1998, "The IntelliQuest and Coolsavings Offer Innovative Online Customer Relationship Management Program for Technology Vendors" Business Wire.
Shermach, "Elctronic Coupon Programs Offers Data-Base Potential," Marketing News, Sep. 25, 1995.
Soloman, Stephen D., "American Express Applies For A New Line of Credit" The New York Times, Jul. 30, 1995, Sec. 6; p. 34, col. 1; Magazine Desk.
Staff Reporter, "NASD Has Transferred Issues to National List", The Wall Street Journal, Sep. 19, 1984.
Stepenski, Ron, "Computer is One-Step Comparison Shopper", The Record Business, Dec. 7, 1984.
Sun, Lena H., "Checking Out The Customer; New Technology Can Give Stores Detailed Knowledge About Buyers' Habits", The Washington Post, Jul. 9, 1989, Financial; p. H1.
Tomlin, Kenny, "Rockfish Blog," Rockfish Technology—Online Coupon Management. http://rockfishblog.com/entries/2009/9/18/rockfish_technology.aspx, Feb. 10, 2010.
TC3600 and Weinhardt, Bob, Quality Assurance Specialist, TC3600, "When Is Electronic Document A Printed Publication For Prior Art Purposes?" presented at the USPTO's Business Methods Partnership Meeting, Apr. 1, 2003, 32 pages.
Uesato et al., "An Information system changes a market of an electronic commerce," Nikkei Computer No. 375 Nikkei Businees Publications, Inc. of Oct. 2, 1995, pp. 80 to 91.
Uniform Code Council, Inc.., Sep. 1994, "U.P.C. Coupon Code Guidelines Manual," pp. 1:30-1:39.
Uniform Code Counsel, Inc., "UPC Coupon Code Guidelines Manual," Sep. 1994, pp. 1:30-1:39.
Urbanski, AI, "Cents-Off Online", Food & Beverage Marketing of Sep. 1995.
USPTO office action on U.S. Appl. No. 12/704,376 mailed Oct. 12, 2011.
Various Articles Concerning "ZING" Technology; Apr. 10, 1995.
Walker, Kelly, Excerpt from Marketing: "The Electronic Coupon", Forbes, Nov. 19, 1984.
Wallace, Anise C., "Hunting for Bargains in a Dull Market", The New York Times, May 27, 1984.
Watt, Peggy, "Electronic Mall Lets Consumers Shop at Home", InfoWorld of Apr. 9, 1984, vol. 6, Issue 15.
Wellman, David, "Painting the Target", from Food & Beverage Marketing, Sep. 1996, v15 n9, p. 16 (2).
Whalen, Jeanne, "Grocers build frequency, loyalty on coupon systems", Advertising Age, May 8, 1995.
www.archive.ord/about.about.php, Internet Archive, 10 page printout from web site,Jan. 10, 2003.
www.archive.org, five-page print out from web site, Jan. 10, 2003.
Yan et al., "SIFT—A Tool For Wide-Area Information Dissemination," Paper presented at the USENIX Technical Conference, New Orleans, LA, Jan. 1995, pp. 177-186.
Zakon, "Hobbes" Internet Timeline, http://www.zakon.org/robert/internet/timeline, accessed Apr. 1, 2003, 33 pages.
Zuckerman, Steve, "Coupons Turning High-Tech", Dallas Times Herald, Jun. 18, 1983.
In This Computer Age, Who Needs Coupons? The New York Times; Jun. 15, 1989.
Consumers Find More Ways to Save via Downloadable Coupons on Redplum.com; Valassis Investor—Press Releases, Dec. 15, 2011; 1 page.

COUPON FLOW
1
COUPON ISSUER
SELECTION PRINTING & REDEMPTION INFORMATION
2
SERVICE DATA BASE
PRINTING INFORMATION
SELECTION INFORMATION
REDEMPTION INFORMATION
3
CONSUMER'S PC
REDEMPTION INFORMATION
4
Coupon File
5
CONSUMER'S PRINTER
7
6
coupon
0002345TJ228
ISSUER DATA BASE
SUBMITTED AT CHECKOUT
AUTOMATICALLY REDEEMED WITH PURCHASE
8
RETAIL OUTLET

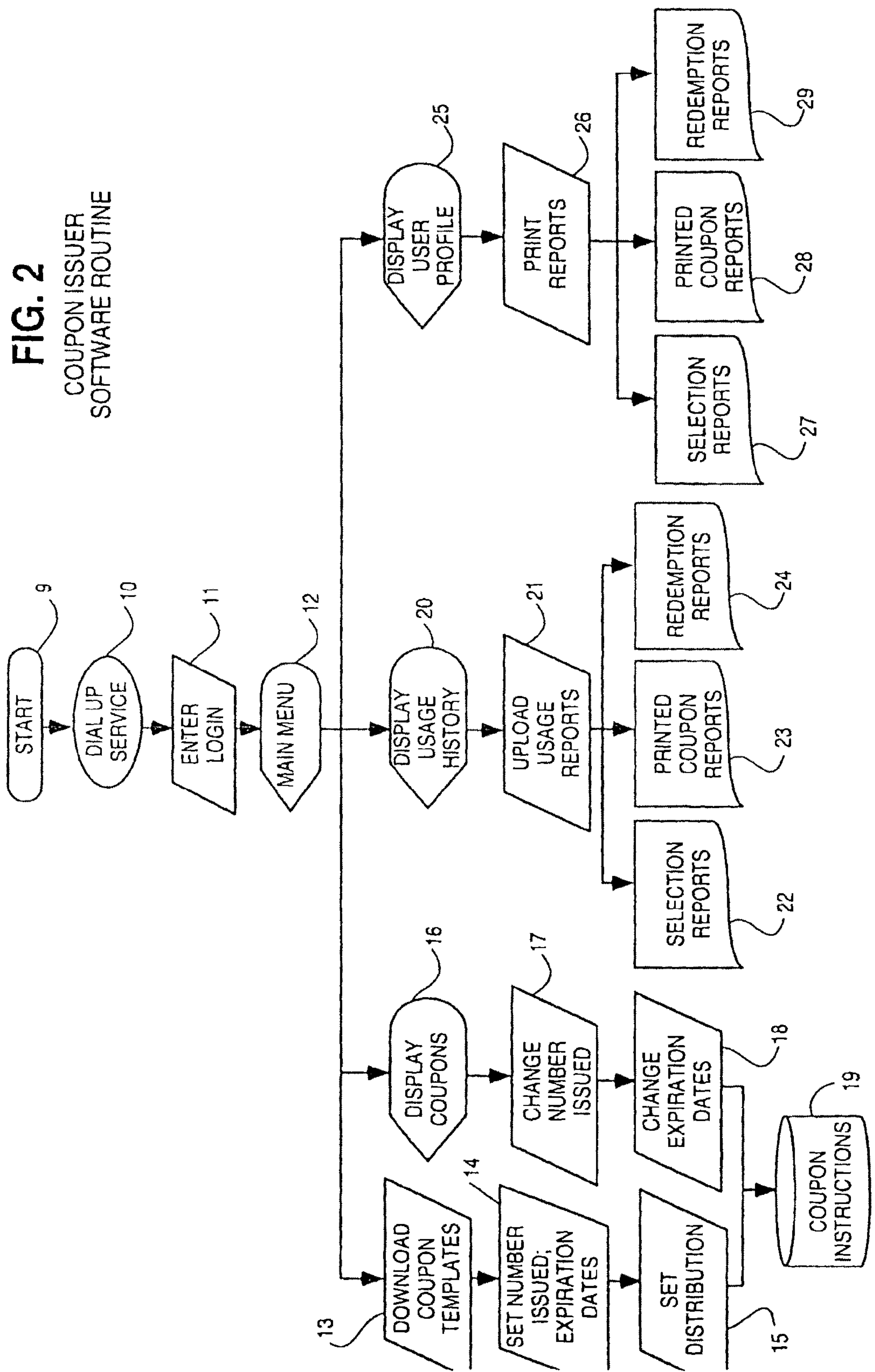
FIG. 2
COUPON ISSUER SOFTWARE ROUTINE
START
9
DIAL UP SERVICE
10
ENTER LOGIN
11
MAIN MENU
12
DOWNLOAD COUPON TEMPLATES
13
SET NUMBER ISSUED; EXPIRATION DATES
14
SET DISTRIBUTION
15
DISPLAY COUPONS
16
CHANGE NUMBER ISSUED
17
CHANGE EXPIRATION DATES
18
COUPON INSTRUCTIONS
19
DISPLAY USAGE HISTORY
20
UPLOAD USAGE REPORTS
21
SELECTION REPORTS
22
PRINTED COUPON REPORTS
23
REDEMPTION REPORTS
24
DISPLAY USER PROFILE
25
PRINT REPORTS
26
SELECTION REPORTS
27
PRINTED COUPON REPORTS
28
REDEMPTION REPORTS
29

SERVICE
SOFTWARE ROUTINE
COUPON ISSUER
1
INCOMING
OUTGOING
CONNECT
33
COUPON
INSTRUCTIONS
19
CREATE
NUMBER
SERIES
34
UPDATE
ACTIVE
SYSTEM
COUPONS
35
ACTIVE
SERVICE
COUPONS
36
OUTGOING
CONNECT
37
CONSUMER'S PC
3
CONNECT
38
INCOMING
USAGE
HISTORY
39
UPDATE
COUPONS
SELECTED
40
UPDATE HH
PROFILE
41
UPDATE
ISSUER
REPORTS
42
CONNECT
44

CONSUMER SOFTWARE ROUTINE

RESERVATION FLOW

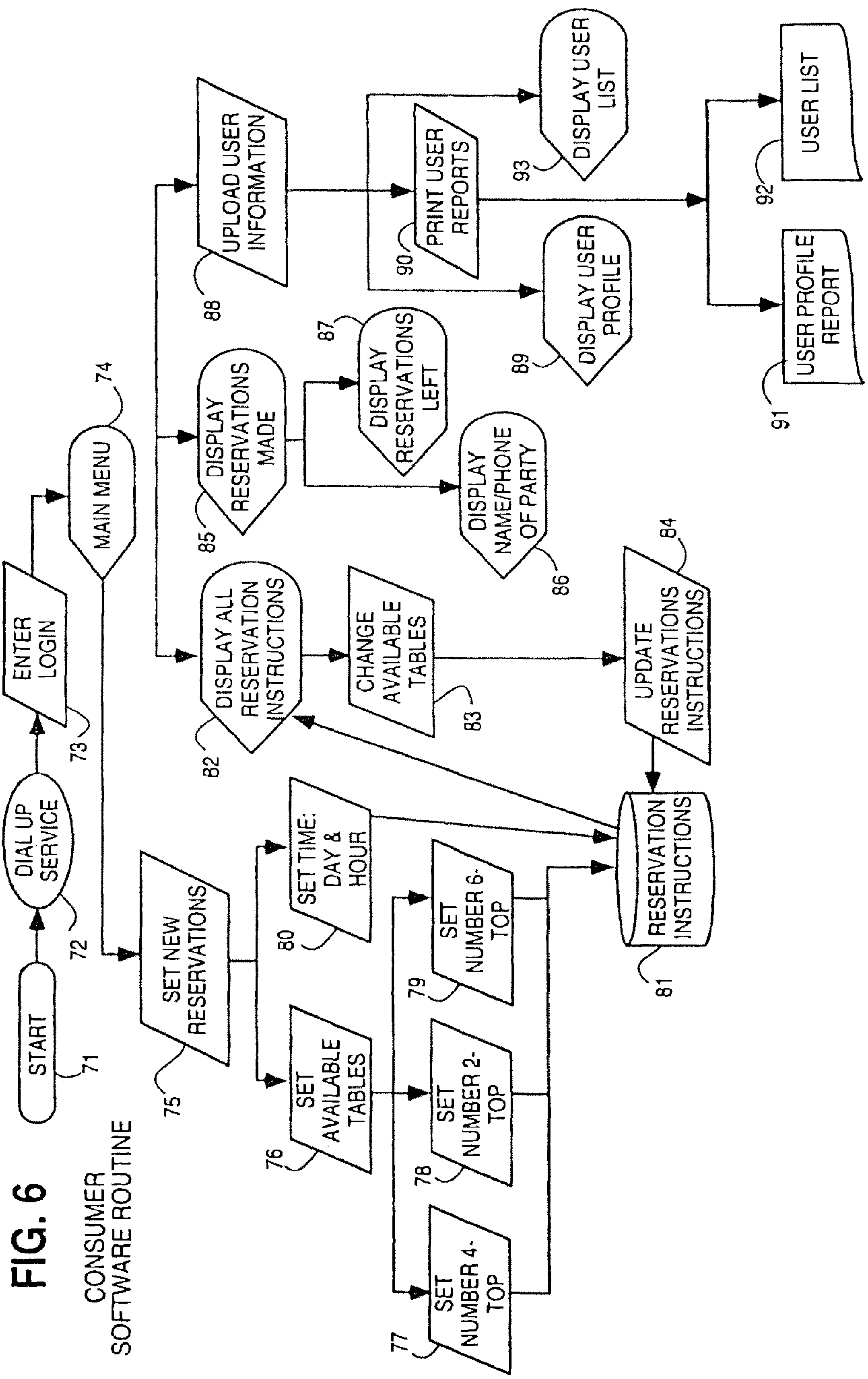
FIG. 6
CONSUMER SOFTWARE ROUTINE
START
71
DIAL UP SERVICE
72
ENTER LOGIN
73
MAIN MENU
74
SET NEW RESERVATIONS
75
SET AVAILABLE TABLES
76
SET NUMBER 4-TOP
77
SET NUMBER 2-TOP
78
SET NUMBER 6-TOP
79
SET TIME: DAY & HOUR
80
RESERVATION INSTRUCTIONS
81
DISPLAY ALL RESERVATION INSTRUCTIONS
82
CHANGE AVAILABLE TABLES
83
UPDATE RESERVATIONS INSTRUCTIONS
84
DISPLAY RESERVATIONS MADE
85
DISPLAY NAME/PHONE OF PARTY
86
DISPLAY RESERVATIONS LEFT
87
UPLOAD USER INFORMATION
88
DISPLAY USER PROFILE
89
PRINT USER REPORTS
90
USER PROFILE REPORT
91
USER LIST
92
DISPLAY USER LIST
93

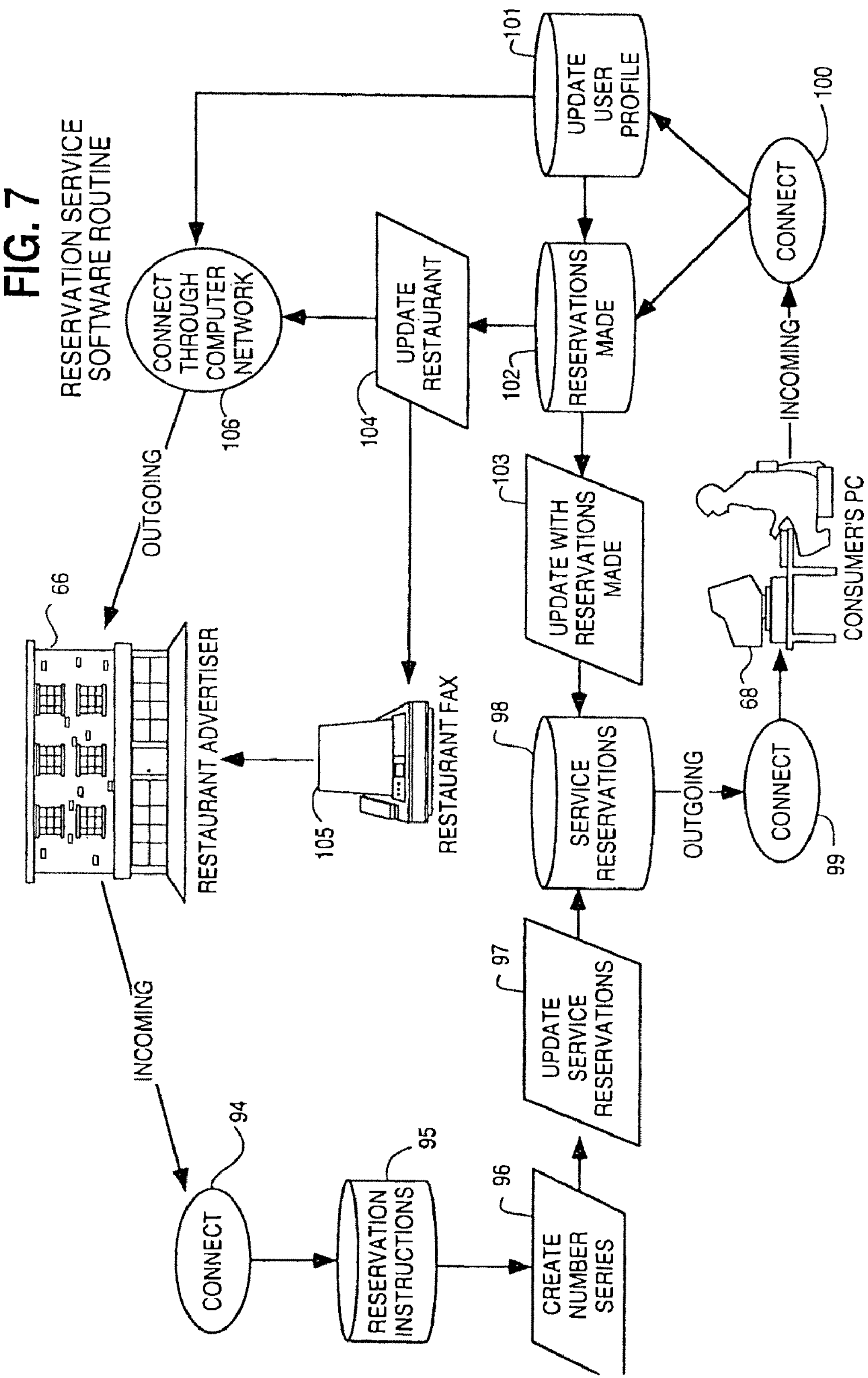
FIG. 7
RESERVATION SERVICE SOFTWARE ROUTINE
CONNECT THROUGH COMPUTER NETWORK
106
UPDATE RESTAURANT
104
RESERVATIONS MADE
102
UPDATE USER PROFILE
101
CONNECT
100
INCOMING
OUTGOING
66
RESTAURANT ADVERTISER
105
RESTAURANT FAX
UPDATE WITH RESERVATIONS MADE
103
CONSUMER'S PC
68
SERVICE RESERVATIONS
98
OUTGOING
CONNECT
99
INCOMING
CONNECT
94
RESERVATION INSTRUCTIONS
95
CREATE NUMBER SERIES
96
UPDATE SERVICE RESERVATIONS
97

CONSUMER SOFTWARE ROUTINE
START
107
DISPLAY MAIN MENU
108
DIAL UP SERVICE
109
ENTER PIN
110
DISPLAY RESERVATIONS
111
DOWNLOAD RESERVATIONS
112
SEND TO PRINTER
113
ADD NAME & PHONE NUMBER
114
PRINT CONFIRMATION SLIP
115
CONFIRMATION SLIP
116
USER PROFILE
117
UPDATE USER PROFILE
118
UPDATE SERVICE RESERVATIONS
119
UPDATE USER PROFILE
120
DISPLAY USER PROFILE
121
UPDATE USER PROFILE
122

INTERACTIVE MARKETING NETWORK AND PROCESS USING ELECTRONIC CERTIFICATES

BACKGROUND OF THE INVENTION

This application is a continuation of U.S. patent application Ser. No. 12/157,053, filed Jun. 6, 2008, which is a continuation of U.S. patent application Ser. No. 09/490,362, filed Jan. 24, 2000 (now U.S. Pat. No. 7,401,032), which is a continuation of U.S. patent application Ser. No. 09/073,334, filed May 6, 1998, which is a continuation of U.S. patent application Ser. No. 08/507,693, filed Jul. 25, 1995 (now U.S. Pat. No. 5,761,648), the disclosures of which are incorporated by reference herein in their entirety.

The present invention generally relates to the use of an interactive marketing network. More specifically, the present invention relates to the interactive use by service providers and consumers of electronic certificates over online networks.

Increasingly, consumers are gaining direct access to data bases for information and entertainment, whether through phone lines and coaxial cable or by wireless connections from cell systems and satellites. With this so-called “online” access, consumers can use data bases for a range of activities at virtually any time. Besides granting freedom to the consumer, online access gives added efficiencies to companies merchandising products and services, whether those products are sold directly to the consumer by mail or in a store.

At the same time, various types of transactions are currently consummated using certificates such as coupons, tickets, etc. These certificates typically contain data (referred to in the claims as “transaction data”) describing the particular transaction (e.g., in the case of a coupon, the transaction data would include a product description, the coupon amount, and the expiration date). These certificates also typically contain data (referred to in the claims as “identification data”) such as various numbers, letters, barcodes or other symbols sufficient-to uniquely identify each certificate.

The need arises for creation of an online “electronic certificate” that can be used for promotional or transactional purposes, much as coupons have been used in such traditional marketing vehicles as newspapers and mail packs. Beyond offering a discount as an incentive to buy a feature product, the coupon is also currency, printed in quantities limited by the issuer and often carrying unique serial numbers, expiration dates and “source codes” which indicate the means by which it was distributed (e.g. newspaper, mail list, in-store dispenser, etc.), so issuers can track the effectiveness of each marketing medium.

Known coupon dispensing systems, for example, fail to interactively communicate between a service center and a third party, as pointed out in U.S. Pat. No. 5,303,197 to Axler. While the Axler patent permits an operator to periodically “visit” a dispensing machine, this does not allow “real time” interactivity (e.g., it does not permit the operator to access and analyze demographical data contemporaneous with its input). Nor does Axler (or any other known prior art systems) envision the creation of an online “electronic certificate,” as will be described below.

A data processing system and method according to the present invention successfully emulates the attributes of a coupon over an online network (i.e., an “electronic coupon” is created). Moreover, given the direct access to consumers, the data processing system exceeds the capabilities of traditional coupons by providing issuers a greater degree of control in targeting the offer, restricting its use and tracking both the selection and redemption process. The data processing system’s controls also make it possible for service providers, such as restaurants and hotels, to use an online electronic certificate as a promotional means and a way to lower overhead in providing such transactions as dining, travel and ticket reservations.

SUMMARY OF THE INVENTION

The present invention provides a data processing system and method permitting consumers to access a data base online and use electronic certificates. The data processing system identifies and marks each electronic certificate with a code distinguishing it from all other certificates and with another code identifying the user. In addition, the data processing system permits coupon issuers to go online as well to create the certificate and specify controls that restrict the total number of certificates issued as well as the number to be issued to each individual.

The data processing system also preferably issues reports as soon as the consumers choose a certificate from the data base and have it downloaded to their resident storage systems or “remote computer terminals.” Reports can be generated that show whether the consumer had the certificate printed with the consumer’s printer or had it sent, as a computer-record, back to the service data base. All of these reports can assist the issuer in research, security, and confirmation of a purchase or reservation.

In a preferred embodiment, the data processing system of the present invention can issue electronic certificates created by an operator, and permits the storing and retrieval of data pertaining to the certificates entered by users of a communicating first set of remote computer terminals. This embodiment includes a service system including a first computer processor for processing data and a first computer storage system for storing data on a storage medium. Also included is an issuer system including a second computer processor for processing data and a second computer storage system for storing data on a storage medium. The issuer system permits the operator to provide the service system with instructions for issuing a predetermined type and number of the electronic certificates. The service system is in selective electrical communication with both the issuer system and each of the remote computer terminals. Preselected identification data stored within either the first or the second computer storage systems and useable by either the first or the second computer processors is used to provide the first computer processor with appropriate instructions for associating each of the issued electronic certificates with one or more identifying symbols. Users of the remote computer terminals are then permitted to controllably access the electronic certificates.

A process for providing an interactive marketing system capable of using electronic certificates that can be accessed online by remote computer terminals linked within a computer network also forms part of the present invention. In this embodiment, an online network is provided including an issuing site having a first computer processor and a first computer storage system, and a service site having a second computer processor and a second computer storage system. The issuing site and the service site are in electrical communication, and the service site and each of the remote computer terminals are also in electrical communication. Instructions for issuing a predetermined number of electronic certificates are transmitted from the issuing site to the service site, each of the certificates including transaction data. The service site, upon receiving these instructions, revises the electronic certificates by providing the issued electronic certificates with unique identification data. The revised electronic certificates can then be accessed by users of the remote computer terminals. Consumer data entered by the remote computer terminal users can be provided to the service site, and then selectively transmitted to the issuing site. Each of these steps can be selectively repeated, as required.

In a second preferred process embodiment of the present invention, a process for selectively storing, retrieving and transmitting reservation data is provided. First, a computer operating system is provided, including an issuing site with an issuing computer having an initial set of reservation instructions, and a service site with a service computer also having the initial set of reservation instructions. The issuing and service computers of the computer operating system are in electrical communication. Next, updated reservation data is transmitted from remote computer terminals electronically linked to the service computer. The updated reservation data is used by the service computer to revise the initial set of reservation instructions, resulting in a revised set of reservation instructions contained within the service computer. Now, data pertaining to the revised set of reservation instructions is transmitted from the service computer to the issuing computer. The data pertaining to the reservation instructions can be contained within the service computer in the form of an electronic reservation coupon, which can be printed by the remote computer terminal users. Again, these steps can be selectively repeated, as required.

In its broadest embodiment, the system of the present invention is used to create an electronic certificate. This system includes a computer system that can process and store data. The computer system is capable of creating a plurality of electronic certificates. Each of the electronic certificates contains transaction data and unique identification data, and can be accessed by remote users linked to the computer system.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 2 is a flowchart of a software routine for a coupon issuer according to the present invention;

FIG. 6 is a flowchart of a software routine for a restaurant according to the present invention;

FIG. 7 is a flowchart of a software routine for the reservation service provider according to the present invention.

DETAILED DESCRIPTION OF THE FIRST PREFERRED EMBODIMENT

Figure 1:
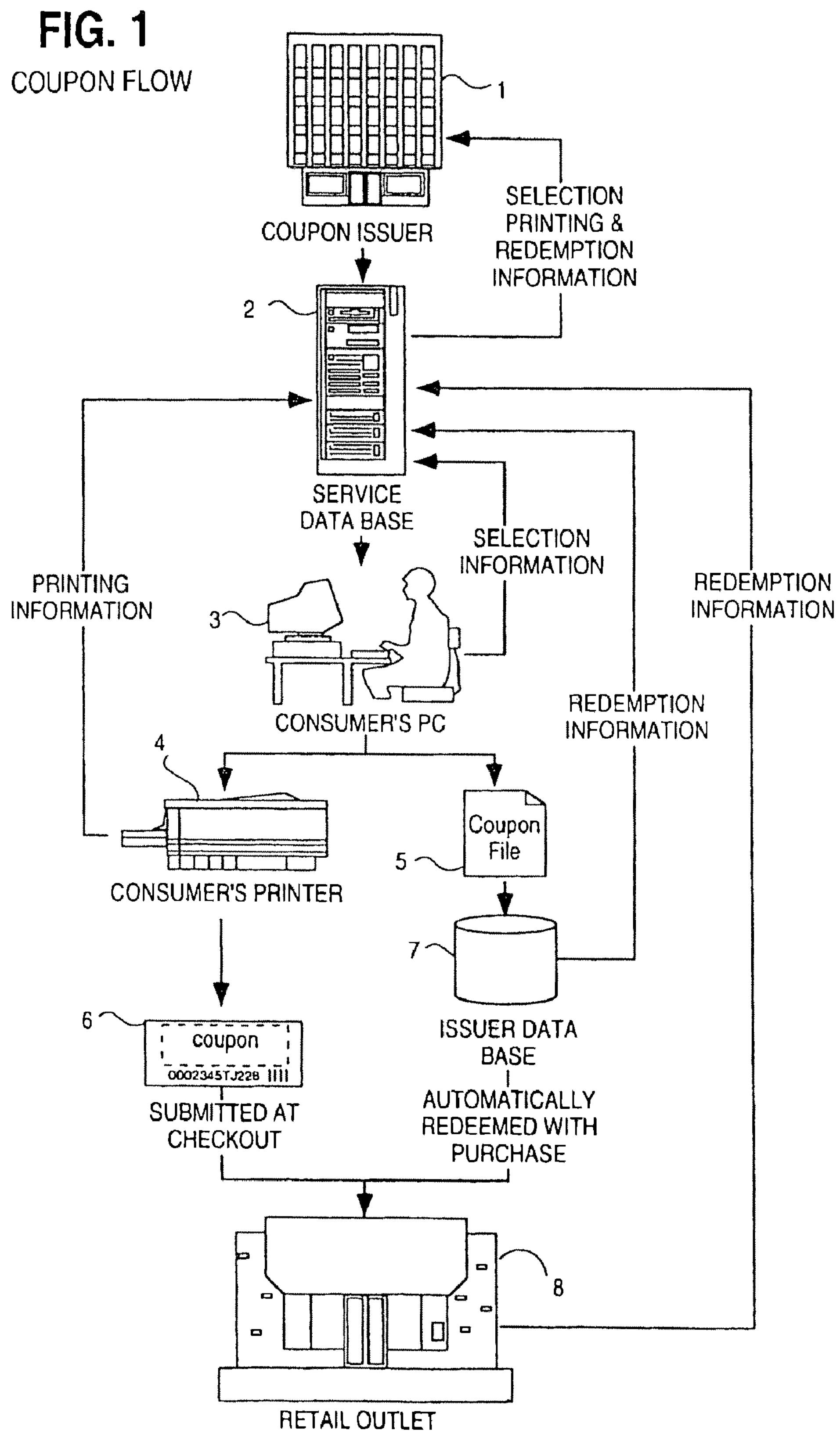
FIG. 1 depicts the flow of information in a system delivering online coupons to consumers.

The present invention is directed to a data processing system and method for use in dispensing and using electronic certificates such as coupons over online systems. FIG. 1 is an overview showing how the information and activities flow from creation of the electronic certificate to its selection and printing by the consumer, and its ultimate redemption. The process starts with the coupon issuer 1 who creates the coupon instructions (which will typically include the transaction data) and downloads them to the service data base 2 which receives the instructions and assigns the identification data and issue restrictions. The service data base 2 can then display the active coupon files to the consumer, and make the designated amount available for downloading to the consumer's personal computer (PC) 3 or other input device. The consumer's PC 3 may download no more electronic coupons than the number specified in the coupon issuer 1 instructions.

Anytime before a coupon file's expiration date, the consumer may use one of two methods to redeem it, as shown in FIG. 1. First, the electronic coupon can be printed with a printer attached to the consumer PC 3 or other input device. Since files relating to the electronic coupon remain in the storage device of the consumer's PC even after the consumer signs off with the service data base 2, the consumer can quickly disconnect from the online system, and print the coupon later, at his/her leisure. Printed on the coupon 6 would be the expiration date, a unique serial number (distinguishing that coupon from all others) and a barcode with the personal identification number (PIN) of the consumer. This identification data is preferably assigned by the service data base 2; the PIN number can be pre-assigned to individual consumers when they register for the system. That printed coupon can then be submitted during check-out from a participating retail outlet and the stated credit would be deducted from the consumer's bill.

With the second method of redeeming a coupon, the consumer PC 2 transmits the selected coupon file 5 to a data base 7 designated by the issuer, where it is stored with the same information as the printed coupon, including the transaction and identification data. The checkout system at the retail outlet 8 would then automatically activate the discount if the consumer presented a store credit card or a third-party credit card and purchased the designated product. Preferably, the electronic transfer of the coupon from the consumer PC to data base 7 can only be done on-line. (This permits the service data base 2 to accurately track the coupon's printing or presentation activity, as discussed below.)

Information can also be passed back up through the system, first to the service data base 2 and then on to the coupon issuer 1. Thus, information about the coupon files or other demographical information, for example ("consumer data or profile data") can be downloaded by the consumer PC 3 and the coupon files can be sent to the consumer's printer 4 or to an issuer data base 7. Redeemed printed coupons 6 could also have their barcodes scanned by the service to identify, for research purposes, the consumers who used the coupons. (For increased security, at check-out the barcode could be compared to ensure the consumer identity corresponds with the barcode.) Such information could also be transmitted from a coupon file 5 that is redeemed automatically.

FIG. 2 depicts a software routine enabling the coupon issuer to download new coupon instructions, change old instructions, or upload information on coupon use. The routine begins 9 with dialing up the coupon service 10. To access the system, the issuer first enters a login password 11 (at which time the use of a preassigned registration number can be required). A main menu 12 is then displayed. Among the choices is creating new coupon instructions, which starts with a download of coupon templates 13 along with commands to set the number of coupons to be issued (both in total and to each individual consumer) and commands to set expiration dates 14. Commands can also be issued to limit coupon distribution by area or by a consumer's household profile 15. These coupon instructions are added to previously issued coupons. The issuer can review these electronic coupons 16 and then modify instructions as to (e.g.) numbers issued 17 or expiration dates 18. Previously issued coupons could also be deleted" from the system should the issuer decide to do so. (They will be automatically deleted from the system following expiration.) These changes are used to update the coupon instructions 19 resident in the service data base.

Issuers can also access the system for usage history 20 to determine the remaining number of previously issued coupons. Further, the issuer can upload reports 21 based on the number of coupons selected 22, printed 23, and redeemed 24. Another function of the software is to analyze use based on the shopping habits and demographic characteristics of the user. This consumer or profile data can be contained in the household profile, submitted by the consumer to register for the system and periodically updated with additional questions and usage history. An issuer can display information about those who have selected the issuers' coupons, generically referred to here as "correlation data" breaking down use by such factors as region and demographics 25. In addition, the issuer can upload user reports 26 based on selection 27, print commands 28, and redemption 29.

Figure 3:
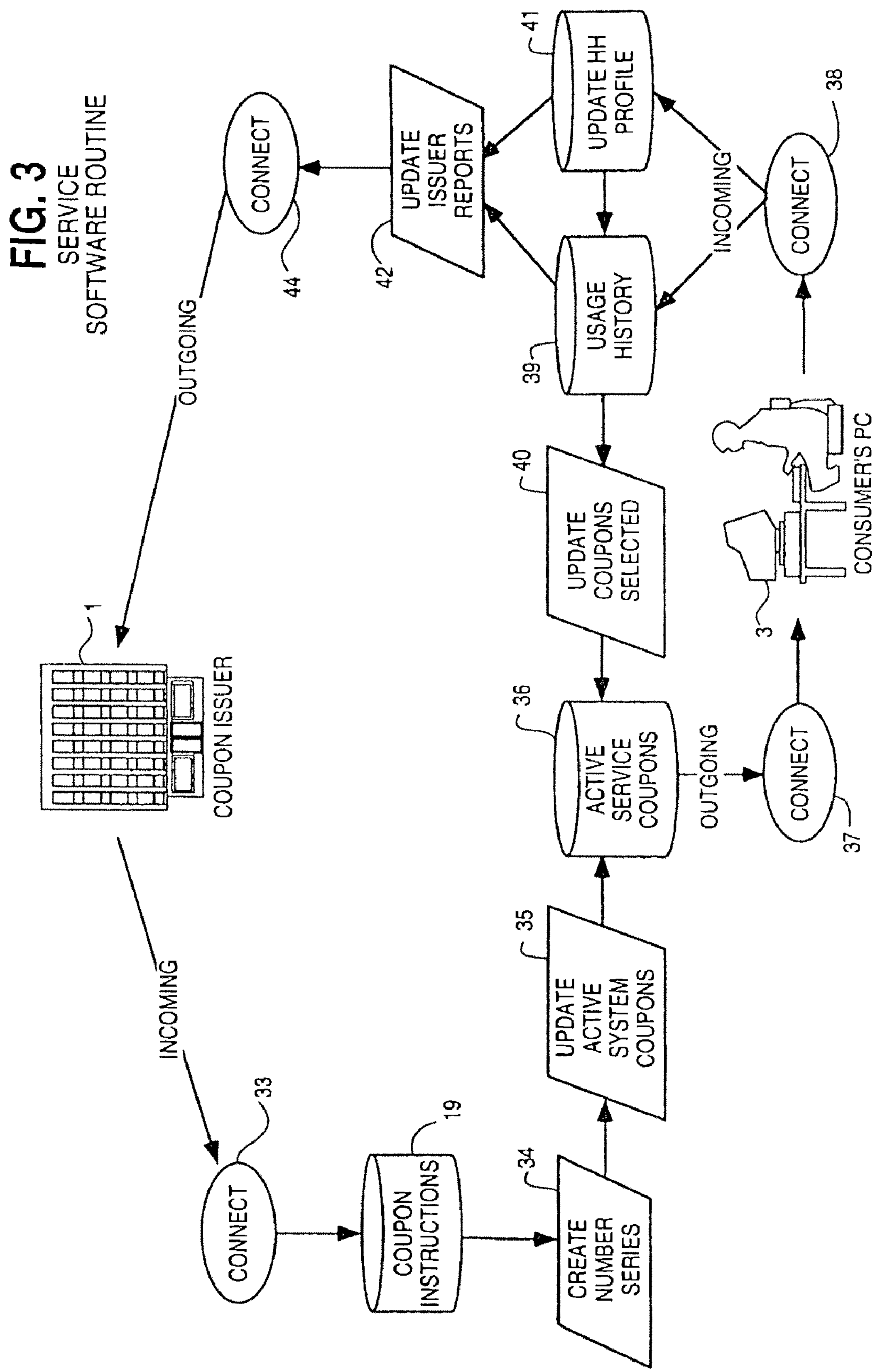
FIG. 3 is a flowchart of a software routine for the online coupon service provider according to the present invention.

The service data base, as shown in FIG. 3, is the bridge between the coupon issuer 1 and the consumer 3, and permits the flow of both incoming and outgoing information. First, over an online network 33, the service receives the coupon instructions 19 sent by the coupon issuer 1. The service software takes the instructions and assigns the requisite serial numbers 34 and issue restrictions. These new or changed coupons are then sent to update 35 the active service coupons 36 already in disk storage for that issuer. These active service coupons are part of the outgoing information sent to the consumer over the online network 37. Consumer usage information goes back the other way through the network 38. The service system takes usage information 39 on selection and updates the number of active services coupons remaining. Also incoming from the consumer is household profile information 41. The service takes this information and updates user reports 42 which are sent back through the network 44 to the issuer, completing the information circuit.

Figure 4:
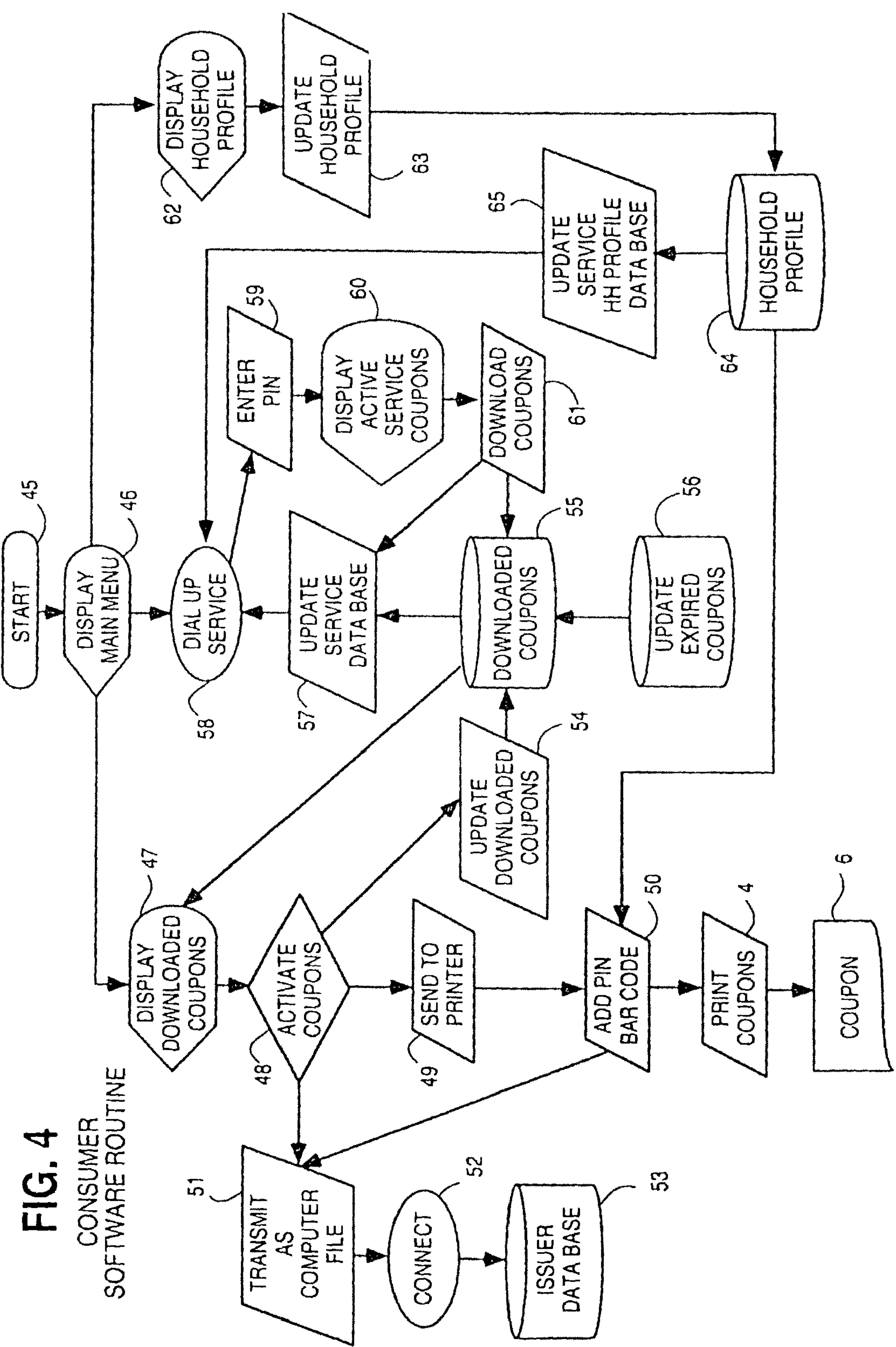
FIG. 4 is a flowchart of a software routine for the consumer using the coupon service according to the present invention.

FIG. 4 displays the software routine for the consumer. It starts 45 with a display of the main menu 46. The consumer may display the coupons that have already been downloaded and are resident on the consumer's PC 55. There are two methods by which the consumer could activate the coupons 48. The first would be to send the coupon file 49 to the consumer's printer. Along the way, it is barcoded with the consumer's PIN 50, which is accessed from the household profile data base 64. The consumer's printer 4 then prints out the coupon 6. Upon activation 48, a coupon could also be transmitted as a computer file 51, back through the network 52, to a data base chosen by the issuer. When coupons are activated 48, the consumer's resident software removes the coupon file that has been printed 54, updating the data base of downloaded electronic coupons 55 and the resident coupon display 47. The system also automatically removes expired coupon files that have yet to be activated 56. Another function of the resident software is displaying 62 and updating 63 the household profile 64 with information entered by the consumer in response to questions submitted by the service.

To access a new selection of coupons, the consumer can dial up the service data base 58, enter the PIN number 59, and view a display of all active service coupons 60. These coupons can then be selected and downloaded 61 to the consumer's PC. While online, the consumer's software automatically sends back to the service data base information on the consumer's selection and printing history 57, as well as information on those downloaded coupon files that have expired 56. It also sends back updated information on the consumer's household profile 65.

DETAILED DESCRIPTION OF THE SECOND PREFERRED EMBODIMENT

Figure 5:
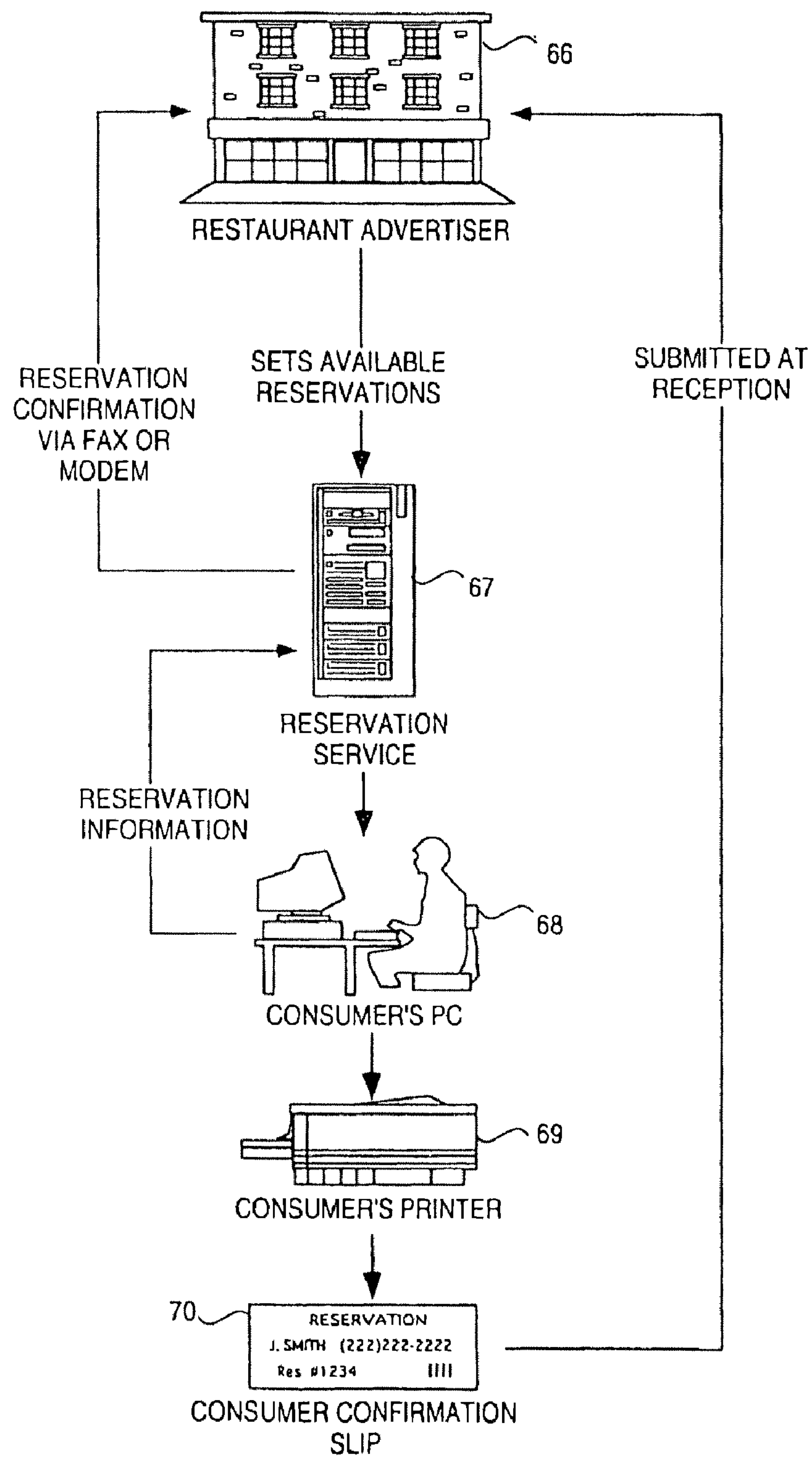
FIG. 5 depicts the flow of information In a system providing for restaurant reservations.

A second embodiment of the present invention is directed to a data processing system and method for use in automating reservations over online systems for restaurants, hotels, or other service establishments. FIG. 5 is an overview showing how the information and activities flow from the initial assignment of the reservation by the restaurant, to its selection by the consumer and the ultimate printing of a confirmation slip by the consumer's printer.

The automated reservation process starts with the host computer of the restaurant 66 which sets the number, time, and type of reservations available, and downloads those instructions to the reservation service 67, which receives the instructions and assigns the requisite confirmation numbers and issue restrictions. The reservation service 67 can then display the service's reservations to the consumer, and make them available for access through the consumer's personal computer (PC) 68 or other input device. Once the consumer chooses the restaurant, time and type of reservation (i.e. for two, for four, etc.), the data processing system immediately notifies the restaurant with a description of the reservation, the name and phone number of the consumer and the confirmation number. This information can be sent through the online computer network and also preferably by a designated fax machine (which may be more convenient for the restaurant's front-office staff than a computer). The consumer can then use a printer 69 attached to the consumer PC 68, or another input device, to print a confirmation slip 70. The confirmation slip can have a description of the reservation, the name and phone number of the consumer and the confirmation number. This slip would be presented to reception personnel upon the consumer's arrival at the -restaurant and corroborated with the information that had previously been sent to the restaurant through the system and fax machine.

Feeding back up through the system, first to the service data base 67, and then on to the restaurant 66, is information about the reservations made by the consumer PC 68 and the profile the consumer has submitted as part of the registration process for the service ("consumer data"). This profile is continually updated by the consumer, in response to additional questions, and is also continually updated by the system, in tracking the reservations the consumer has made.

FIG. 6 depicts a software routine for the restaurant to set aside reservations for the system, change old reservations, and upload information on reservation use. The routine begins 71 with dialing up the reservation service 72. To access the system, the restaurant first enters a login password 73. A main menu 74 is then displayed. Among the choices is setting new reservations 75. The type of reservation and number of reservations is determined by setting available tables 76 (e.g., the number of tables available for seating two 78, four 77, and six 79). Instructions also include setting the day and time for the reservations 80. These reservation instructions can be added to previously issued, initial reservation instructions in disk storage 81.

Still referring to FIG. 6, the software can also be used to change previously issued reservations. The restaurant can review these electronic reservation "coupons" 82 and then modify instructions on (e.g.) the numbers of tables available 83. In this operation previously issued reservations could be deleted from the system at the restaurant's option. The updated reservation instructions 81 are then sent to the service data base. The system can also be accessed by restaurants for usage history 85 to view the names and phone numbers of those who have made reservations 86, and to determine the number of remaining reservations for a given hour 87. The restaurant can also upload information 88 on those who have used the service to book reservations at a particular location. A user profile could be displayed 89 and a list of users could be displayed 93, or the restaurant could print user reports 90, and create a hard copy of the user profile 91 or user list 92.

The reservation service, as shown in FIG. 7, is again the bridge between the restaurant 66 and the consumer 68, and handles both incoming and outgoing information. First, over an online network 94, the service receives the reservation instructions 95 sent by the restaurant 66. The service software takes the instructions and assigns the requisite confirmation numbers to each reservation 96. These new or changed reservations are then sent to update 97 the active service reservations 98 already in disk storage for the restaurant. These active service reservations are part of the outgoing information sent to the consumer 68 over the online network 99.

Still referring to FIG. 7, consumer usage information also moves from the consumer's PC back to the restaurant through the network 100. The service system takes the reservation made by the consumer 102 and updates the number of active service reservations remaining 103. This information is also used to update the restaurant 104 through a transmission to the restaurant fax machine 105 and through the computer network 106. Also incoming from the consumer is user profile information 101 which is sent back to the restaurant through the computer network 106.

Figure 8:
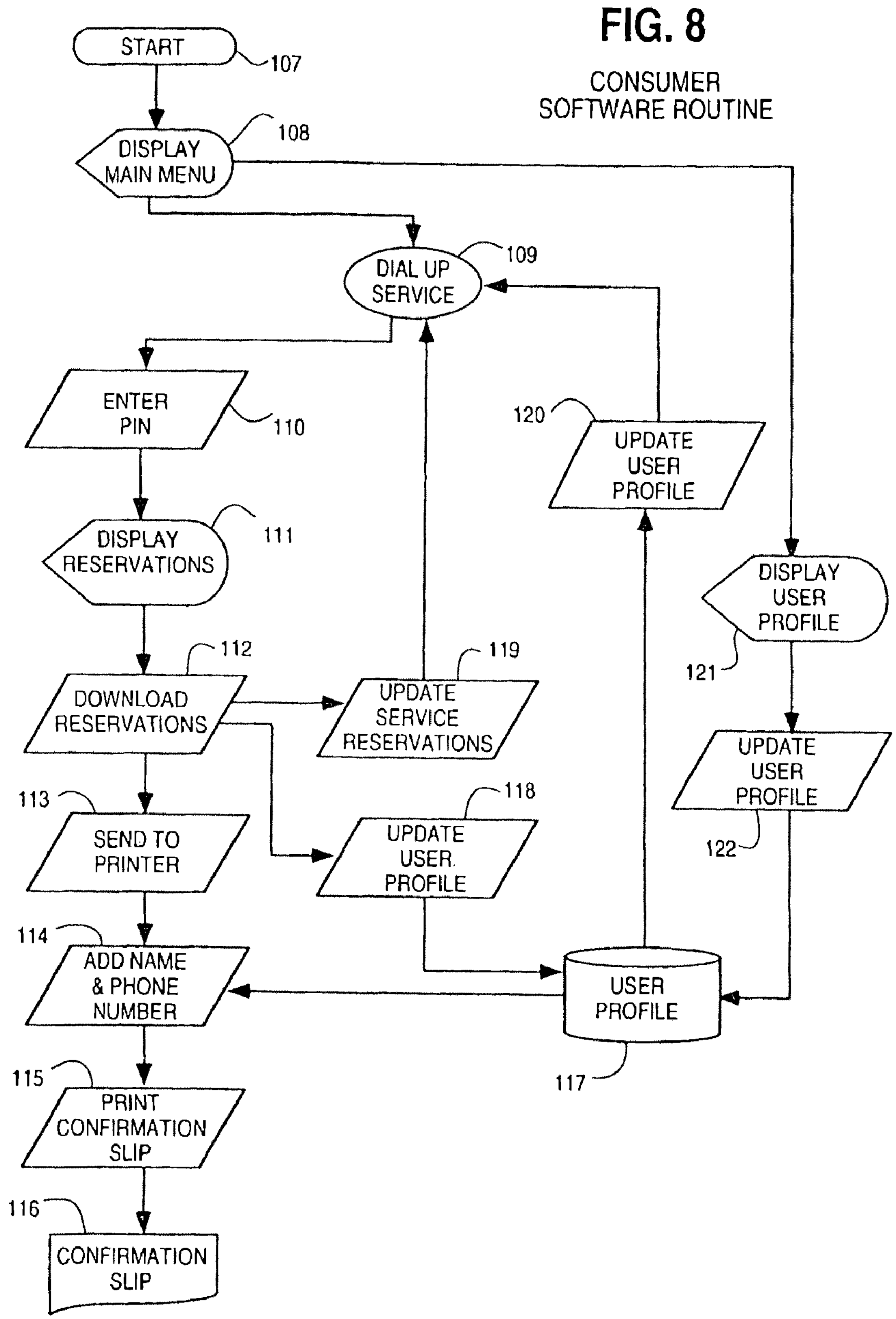
FIG. 8 is a flowchart of a software routine for the consumer using the reservation service according to the present invention.

FIG. 8 displays the software routine for the consumer. It starts 107 with a display of the main menu 108. The consumer can dial up the service data base 109, enter the PIN number 110, and view a display of all active service reservations 111. A reservation can then be selected and downloaded 112 to the consumer's PC, where it is sent to the printer 113. Along the way, the name and phone number of the consumer is taken from the user profile information storage 117 and added 114 to print instructions for the confirmation slip 116. A printer attached to the consumer PC can be used to print 115 the confirmation slip 116.

While online, the consumer's software sends back to the service information on the consumer's reservation 119 to update the remaining service reservations. The reservation also updates the consumer's user profile 117. The updated user profile information is also automatically sent back to the service while the consumer is online 120. The consumer can display the user profile 121 and update the profile 122 with answers to questions prompted to the consumer both during and after the registration process.

It can be appreciated that the present invention can be designed for use with various online software, including American Online®, Prodigy® and Microsoft®.

As will now be understood, the present invention provides an interactive electronic system employing electronic certificates, such as electronic coupons, in which access may be conditioned upon registration (i.e., the entry of specific consumer data such as household profile information). The registration information may then be provided to the service and issuer systems, and may be used to target further offers to specific classes of consumers meeting certain criteria (e.g., demographics). Further, since the interactive electronic system of the present invention also maintains consumer data on past users (e.g., specific households), the electronic certificates may be tailored based upon the consumer data responses.

It will also be appreciated by those skilled in the art that various changes and modifications can be made to the illustrated embodiments without departing from the spirit of the present invention. For example, while the preferred embodiments describe particular types of electronic certificates (coupons and reservation slips), various other types of electronic certificates can be used by systems designed according to the present invention, including certificates used as proof of a gift, award or payment, and virtually any other types of certificates or vouchers. As another example, while the service data base 2 will typically assign identification data to the electronic certificate, this data could be transmitted and assigned together with the transaction data by the coupon issuer 1, or even by a third remote site. Also, rather than utilizing separate issuer and service computers, they could be consolidated into a single computer for particular applications. Further, use could be made of multiple issuer computers, multiple service computers, or combinations of the same, given a particular application. Still further, while the preferred embodiments have described users with "remote computer terminals" that consist of personal computers, users might access the marketing network of the present invention through various other accessing media, such as phone lines, televisions, or individual access stations dedicated for the use and dispensing of various certificates (much like cash machines are used today). These other accessing media would include appropriate software and hardware permitting interactive capabilities with remote computers, similar to that described in the preferred embodiments utilizing the personal computers. These and other modifications and changes within the spirit and scope of the present invention are intended to be covered by the appended claims.

The invention claimed is:

1. A method of distributing electronic certificates comprising:

receiving, at a computer system comprising one or more computers, instructions for issuing electronic certificates from one or more certificate issuers, with the respective certificates associated with one or more products and/or services;

establishing a communications link between the computer system and one or more remote devices communicatively coupled to one or more remote users;

receiving, by the computer system, user data from the remote devices;

enabling receipt of communications from one of the remote users operating at least one of the remote devices by the computer system over the communications link to access and select one or more offers for said electronic certificates using said user data;

storing, using the one or more computers, certificate files in a database, the certificate files containing information relating to one or more of the electronic certificates offered to and selected by the one remote user; and processing, using the one or more computers, data for one or more of the selected certificates contained in the database, to cause discounts corresponding to one or more of the selected certificates to be automatically activated in response to purchase at a retail outlet of one or more products and/or services associated with said selected one or more certificates, where a card identifying an account associated with said one remote user and said retail outlet is presented with the purchase.

2. The method of claim 1, wherein said card is associated with a particular store.

3. The method of claim 1, wherein said card is a credit card.

4. The method of claim 1, comprising:

receiving, at the computer system, user data that includes user demographics or behavioral patterns for a particular one of the remote users; and enabling, using the one or more computers, access by the particular remote user to one or more selective offers for electronic certificates based at least in part on the user demographics or behavioral patterns of the particular remote user.

5. The method of claim 1, comprising:

receiving, at the computer system, user data that includes regional demographic data for a particular one of the remote users; and enabling, using the one or more computers access by the particular remote user to one or more selective offers for electronic certificates based at least in part on the regional demographic data for the particular remote user.

6. The method of claim 1, further comprising:

receiving, at the one or more computers, data concerning electronic certificates automatically activated in response to purchase of one or more products and/or services associated with said selected one or more electronic certificates.

7. The method of claim 6, further comprising identifying, in response to said received data, the one remote user who purchased said one or more products and/or services associated with said selected one or more electronic certificates.

8. The method of claim 1, further comprising:

receiving, at the one or more computers, changes to said instructions for issuing electronic certificates from one or more certificate issuers.

9. A method of distributing electronic certificates, comprising:

receiving, at a computer system comprising one or more computers, instructions for issuing electronic certificates from one or more certificate issuers, with the respective certificates associated with one or more products and/or services;

establishing a communications link between the computer system and one or more remote devices communicatively coupled to one or more remote users;

receiving, by the computer system, user data from the remote devices;

enabling receipt of communications from one of the remote users operating at least one of the remote devices by the computer system over the communications link to access and select one or more offers for said electronic certificates using said user data including user demographics or behavioral patterns;

storing, using the one or more computers, certificate files in a database, the certificate files containing information relating to one or more of the electronic certificates offered to and selected by the one remote user; and processing, using the one or more computers, data for one or more of the selected certificates contained in the database, to cause discounts corresponding to one or more of the selected certificates to be automatically activated in response to purchase at a retail outlet of one or more products and/or services associated with said selected one or more certificates, where a card identifying an account associated with said one remote user and said retail outlet is presented with the purchase.

10. The method of claim 9, further comprising:

receiving, at the one or more computers, data concerning electronic certificates automatically activated in response to purchase of one or more products and/or services associated with said selected one or more electronic certificates.

11. The method of claim 10 further comprising identifying, in response to said received data, the one remote user who purchased said one or more products and/or services associated with said selected one or more electronic certificates.

12. The method of claim 9, further comprising:

receiving, at the one or more computers, changes to said instructions for issuing electronic certificates from one or more certificate issuers.

13. A system for distributing certificates comprising:

a database storing certificate files containing information relating to redeemable coupons offered to and selected by remote users; and a computer system comprising one or more computers operably connected to the database, the one or more computers configured to receive instructions for issuing electronic certificates from one or more certificate issuers, with the respective certificates associated with one or more products and/or services;

the one or more computers configured to establish a communications link between the computer system and one or more remote devices communicatively coupled to one or more remote users;

the one or more computers configured to receive user data from the remote devices;

the one or more computers configured to enable receipt of communications from one of the remote users operating at least one of the remote devices by the computer system over the communications link to access and select one or more offers for said electronic certificates using said user data;

the one or more computers configured to store certificate files in the database, the certificate files containing information relating to one or more of the electronic certificates offered to and selected by the one remote user; and the one or more computers configured to process data for one or more of the selected certificates contained in the database, to cause discounts corresponding to one or more of the selected certificates to be automatically activated in response to purchase at a retail outlet of one or more products and/or services associated with said selected one or more certificates, where a card identifying an account associated with said one remote user and said retail outlet is presented with the purchase.

14. The system of claim 13, wherein said card is associated with a particular store.

15. The system of claim 13, wherein said card is a credit card.

16. The system of claim wherein the one or more computers are configured to automatically remove a certificate that has expired.

17. The system of claim 13, wherein the database stores profile data for one or more of the remote users; and wherein the one or more computers are configured to generate correlation data, the correlation data comprising a correlation of the respective purchase data of a plurality of the users with their respective profile data;

wherein the one or more computers are configured to enable a particular remote user to access and select one or more offers for products and/or services associated with electronic certificates using the correlation data for the respective particular remote user to select one or more certificates for access and selection by the respective particular remote user.

18. The system of claim 13 further comprising:

wherein the one or more computers are configured to update the certificates remaining for a respective one of the remote users based at least in part on purchase data of the one remote user.

19. The system of claim 13, further comprising:

wherein the one or more computers are configured to enable a respective one of the remote users to update his/her respective profile data.

* * * * *